United States Patent
Lee et al.

(10) Patent No.: US 10,034,281 B2
(45) Date of Patent: Jul. 24, 2018

(54) METHOD FOR TRANSMITTING AND RECEIVING DOWNLINK SIGNAL IN WIRELESS COMMUNICATION SYSTEM, AND DEVICE THEREFOR

(71) Applicant: LG ELECTRONICS INC., Seoul (KR)

(72) Inventors: Seungmin Lee, Seoul (KR); Suckchel Yang, Seoul (KR); Hanbyul Seo, Seoul (KR); Inkwon Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/126,515

(22) PCT Filed: Mar. 27, 2015

(86) PCT No.: PCT/KR2015/003043
§ 371 (c)(1),
(2) Date: Sep. 15, 2016

(87) PCT Pub. No.: WO2015/147591
PCT Pub. Date: Oct. 1, 2015

(65) Prior Publication Data
US 2017/0094642 A1 Mar. 30, 2017

Related U.S. Application Data

(60) Provisional application No. 61/971,517, filed on Mar. 27, 2014, provisional application No. 61/986,120, filed on Apr. 30, 2014.

(51) Int. Cl.
*H04W 72/04* (2009.01)
*H04L 5/22* (2006.01)
*H04L 1/18* (2006.01)

(52) U.S. Cl.
CPC ......... *H04W 72/042* (2013.01); *H04L 1/1861* (2013.01); *H04L 5/22* (2013.01)

(58) Field of Classification Search
None
See application file for complete search history.

(56) References Cited

U.S. PATENT DOCUMENTS

2011/0280164 A1* 11/2011 Luo .................. H04L 5/001
370/281
2014/0293893 A1* 10/2014 Papasakellariou .... H04W 72/04
370/329
(Continued)

FOREIGN PATENT DOCUMENTS

| JP | 2015506631 | 3/2015 |
| WO | 2012169744 | 12/2012 |

(Continued)

OTHER PUBLICATIONS

PCT International Application No. PCT/KR2015/003043, Written Opinion of the International Searching Authority dated Jun. 25, 2015, 19 pages.
(Continued)

*Primary Examiner* — Diane Lo
(74) *Attorney, Agent, or Firm* — Lee, Hong, Degerman, Kang & Waimey

(57) ABSTRACT

The present invention relates to a method and a device for receiving a downlink signal by a terminal in a time division duplex (TDD) wireless communication system supporting a wireless resource usage change. Specifically, the present invention comprises the steps of: configuring system information block (SIB)-based uplink-downlink configuration 0 as an uplink (UL) reference configuration; and receiving downlink control information including a first field which defines an uplink (UL) index or a downlink assignment index, wherein the downlink control information is received through a common search space, and the first field is determined as the uplink (UL) index when a downlink control information (DCI) format relating to the DL control information is DCI format 0.

12 Claims, 12 Drawing Sheets

(56) References Cited

U.S. PATENT DOCUMENTS

2016/0044638 A1* 2/2016 Gao .................... H04W 72/042
370/280
2016/0323071 A1* 11/2016 Berggren ................ H04L 5/001

FOREIGN PATENT DOCUMENTS

WO      2013105838     7/2013
WO      2014005529     1/2014

OTHER PUBLICATIONS

Nsn et al., "UCI on PUSCH for TDD eIMTA", R1-140545, 3GPP TSG-RAN WG1 Meeting #76, Feb. 1, 2014, 3 pages.
Nsn et al., "Usage of UL DAI and UL Index with UL reference configuration #0", R1-141522, 3GPP TSG-RAN WG1 Meeting #76bis, Mar. 22, 2014, 2 pages.
Panasonic, "UL Index and DAI bits in DCI format 0/4", R1-141210, 3GPP TSG-RAN WG1 Meeting 76bis, Mar. 21, 2014, 4 pages.
European Patent Office Application Serial No. 15769256.7, Search Report dated Oct. 16, 2017, 9 pages.
Catt, "Remaining details on HARQ-AGK on PUSCH", 3GPP TSG RAN WG1 Meeting #76bis, R1-141177, Apr. 2014, 2 pages.
LG Electronics, "Remaining Details on HARQ Feedback for TDD eIMTA", 3GPP TSG RAN WG1 Meeting #76bis, R1-141330, XP050813791, Apr. 2014, 4 pages.

* cited by examiner

FIG. 2
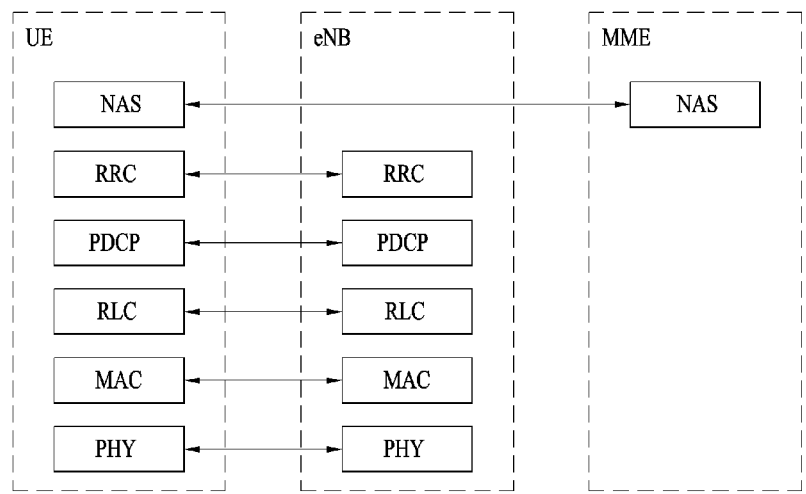
(a) Control-Plane Protocol Stack
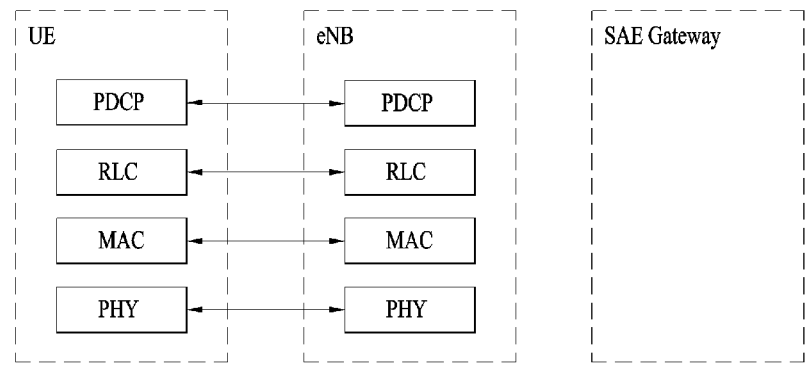
(b) User-Plane Protocol Stack

METHOD FOR TRANSMITTING AND RECEIVING DOWNLINK SIGNAL IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2015/003043, filed on Mar. 27, 2015, which claims the benefit of U.S. Provisional Application Nos. 61/971,517, filed on Mar. 27, 2014 and 61/986,120, filed on Apr. 30, 2014, the contents of which are all hereby incorporated by reference herein in their entirety.

TECHNICAL FIELD

The present invention relates to a wireless communication system, and more particularly, to a method for transmitting and receiving a downlink signal in a wireless communication system and a device therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE

Technical Problem

An object of the present invention devised to solve the problem lies in a method for transmitting and receiving a downlink signal in a wireless communication system and a device therefor.

Objects of the present invention are not limited to the aforementioned objects, and other objects of the present invention which are not mentioned above will become apparent to those having ordinary skill in the art upon examination of the following description.

Technical Solution

The object of the present invention can be achieved by providing a method for receiving a downlink (DL) control signal in a time division duplex (TDD) wireless communication system supporting reconfiguration of a radio resource, including establishing an SIB (System Information Block)-based Uplink-Downlink (UL-DL) configuration 0 as an uplink (UL) reference configuration, and receiving DL control information containing a first field for defining a UL index or a DL assignment index, wherein the DL control information is received through a common search space, wherein, when a DL control information format (DCI format) associated with the DL control information is DCI format 0, the first field is determined to be a UL index.

Further, the DL control information may be received through a UE-specific search space, wherein, when a DL control information format (DCI format) associated with the DL control information is DCI format 0 or DCI format 4, the DL control information may further contain a second field for defining a DL assignment index.

The method may further include transmitting at least one Hybrid ARQ-ACK/NACK (HARQ-ACK/NACK) over a Physical Uplink Shared CHannel (PUSCH), the PUSCH being based on the DL control information. Preferably, at least one UL subframe for transmitting the PUSCH may be determined according to the UL index, wherein a size of the at least one HARQ-ACK/NACK may be defined based on the DL assignment index. A size of the at least one HARQ-ACK/NACK may be determined based only on a UL subframe for transmitting the at least one HARQ/ACK in a piggyback manner among at least one UL subframes for transmitting the PUSCH.

Further, the DL assignment index may be valid only when the DL control information is received on a specific DL subframe, wherein the specific DL subframe may be a DL subframe for reception of DL control information indicating PUSCH transmission in a specific UL subframe based on a DL reference configuration.

Further, when the DL assignment index is not valid, the DL assignment index may be used for virtual cycle redundancy check (virtual CRC).

In another aspect of the present invention, provided herein is a terminal for receiving a downlink (DL) control signal in a time division duplex (TDD) wireless communication system supporting reconfiguration of a radio resource, the terminal including a radio frequency unit, and a processor, wherein the processor is configured to establish an SIB (System Information Block)-based Uplink-Downlink (UL-DL) configuration 0 as an uplink (UL) reference configuration and to receive DL control information containing a first field for defining a UL index or a DL assignment index, wherein the DL control information is received through a common search space, wherein, when a DL control information format (DCI format) associated with the DL control information is DCI format 0, the first field is determined to be a UL index.

Advantageous Effects

According to embodiments of the present measure, only sinners may be transmitted and received when radio resources are dynamically changed according to system load in a wireless communication system.

The effects that can be obtained from the present invention are not limited to the aforementioned effects, and other effects may be clearly understood by those skilled in the art from the descriptions given below.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 is a diagram illustrating structures of a control plane and a user plane of a radio interface protocol between a user equipment and E-UTRAN based on the 3GPP radio access network standard;

BEST MODE

Figure 1:
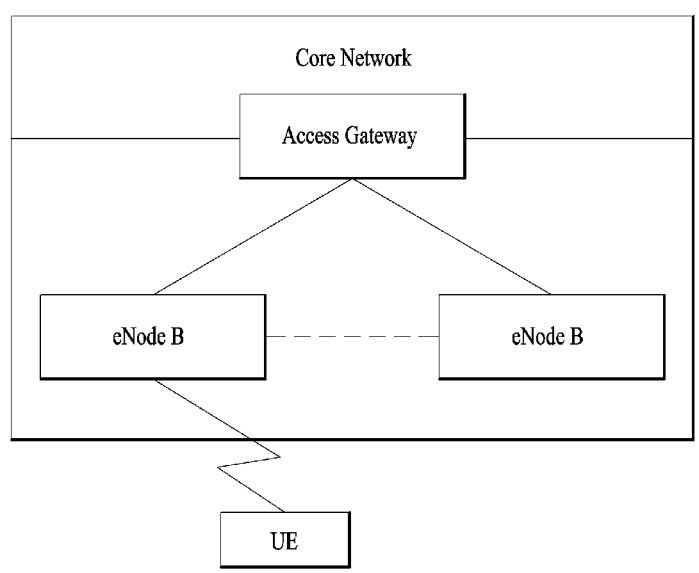
FIG. 1 is a diagram illustrating a network structure of an Evolved Universal Mobile Telecommunications System (E-UMTS) as an example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, reconfiguration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
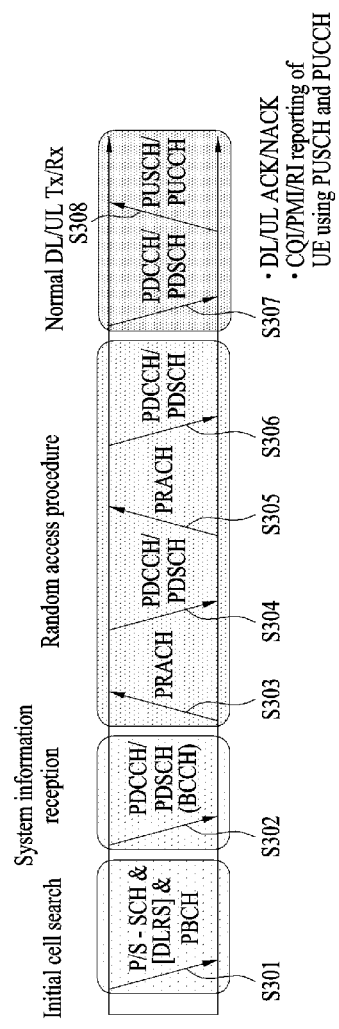
FIG. 3 is a diagram illustrating physical channels used in a 3GPP LTE system and a general method for transmitting a signal using the physical channels.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
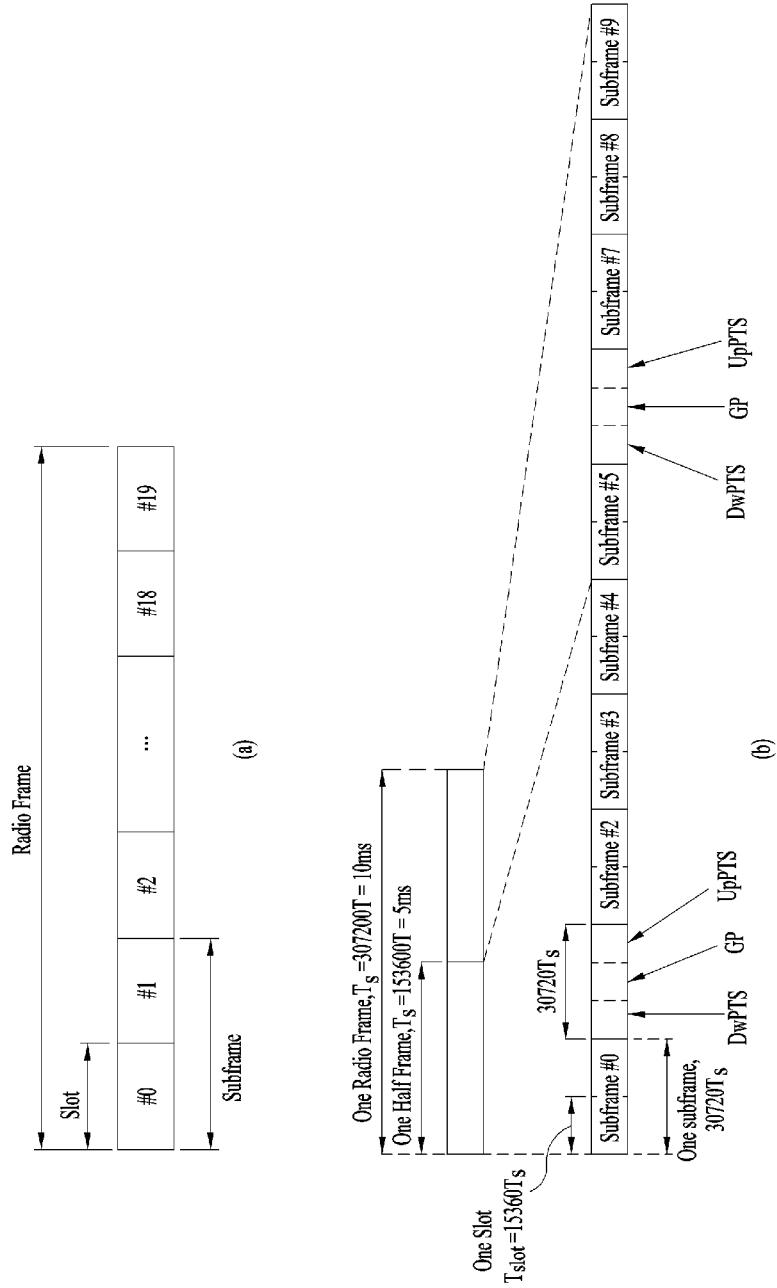
FIG. 4 is a diagram illustrating a structure of a radio frame used in an LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) illustrates the structure of a type-2 radio frame. The type-2 radio frame includes two half frames, each of which has 4 normal subframes including 2 slots and a special subframe including a Downlink Pilot Time Slot (DwPTS), a Guard Period (GP), and an Uplink Pilot Time Slot (UpPTS).

In the special subframe, The DwPTS is used for initial cell search, synchronization, or channel estimation on a UE. The UpPTS is used for channel estimation and acquisition of uplink transmission synchronization for a UE in an eNB. That is, the DwPTS is used for downlink transmission, and the UpPTS is used for uplink transmission. In particular, the UpPTS is utilized for a PRACH preamble or SRS transmission. In addition, the GP is a period between an uplink and a downlink, which is intended to eliminate uplink interference caused by multipath delay of a downlink signal.

The current 3GPP standard document defines configuration of the special subframe as shown in Table 1 below. Table 1 shows DwPTS and UpPTS given when $T_s=1/(15000\times2048)$, and the other region is configured as a GP.

In the TDD system, the structures of the type-2 radio subframe, namely uplink/downlink subframe configurations (UL/DL configurations) are given as shown in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2, D denotes a downlink subframe, U denotes an uplink subframe, and S denotes the special subframe. Table 2 also shows downlink-to-uplink switch-point periodicity in uplink/downlink subframe configuration of each system.

The illustrated radio frame structures are merely illustrative, and various modifications may be made to the number of subframes included in a radio frame, the number of slots included in a subframe, or the number of symbols included in a slot.

Figure 5:
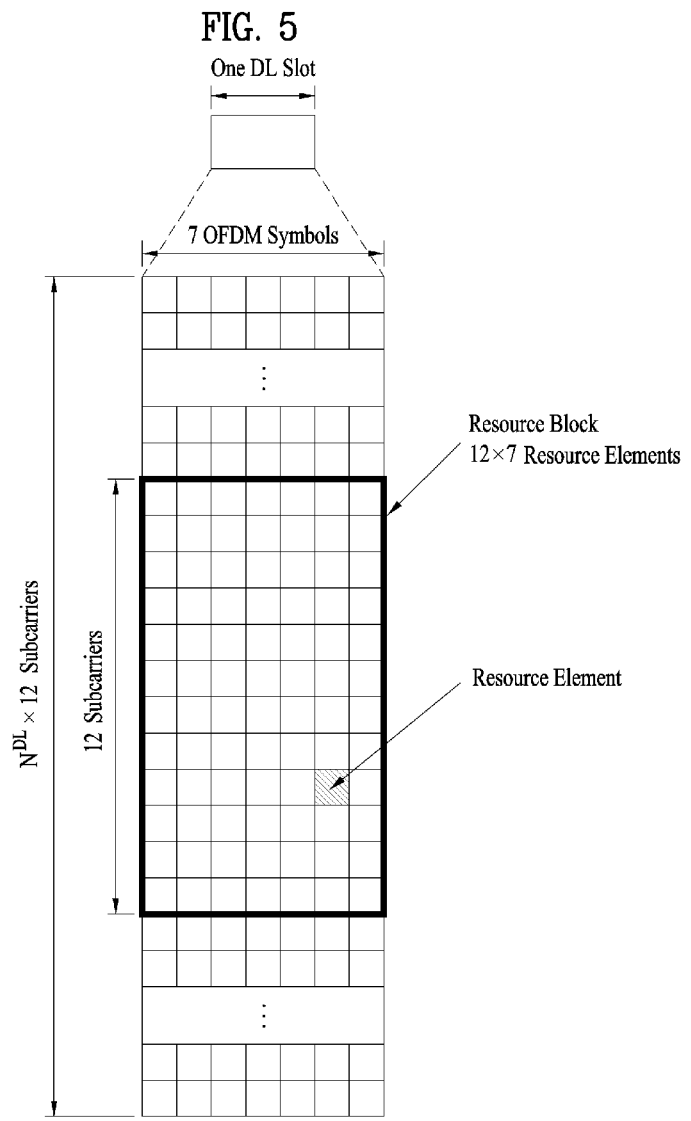
FIG. 5 is a diagram illustrating a resource grid of a downlink slot.

FIG. 5 is a diagram illustrating a resource grid of a downlink slot.

Referring to FIG. 5, the downlink slot includes a plurality of $N_{symb}^{DL}$ OFDM symbols in a time domain and a plurality of $N_{RB}^{DL}$ resource blocks in a frequency domain. Since each resource block includes $N_{sc}^{RB}$ subcarriers, the downlink slot includes $N_{RB}^{DL} \times N_{sc}^{RB}$ subcarriers in the frequency domain. Although FIG. 5 illustrates that the downlink slot includes seven OFDM symbols and the resource block includes twelve subcarriers, it is to be understood that the downlink slot and the resource block are not limited to the example of FIG. 5. For example, the number of OFDM symbols included in the downlink slot may be varied depending on the length of the CP.

Each element on the resource grid will be referred to as a resource element (RE). One resource element is indicated by one OFDM symbol index and one subcarrier index. One RB includes $N_{symb}^{DL} \times N_{sc}^{RB}$ number of resource elements. The

TABLE 1

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — | number $N_{RB}^{DL}$ of resource blocks included in the downlink slot depends on a downlink transmission bandwidth configured in the cell.

Figure 6:
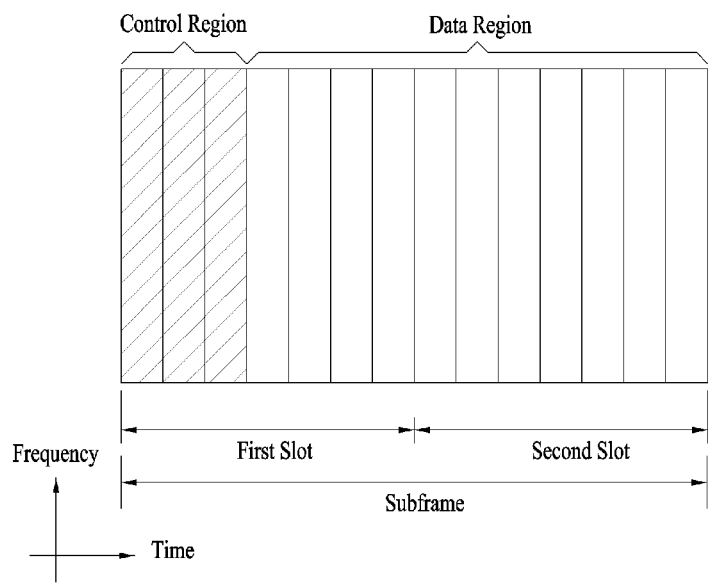
FIG. 6 is a diagram illustrating a structure of a downlink subframe.

FIG. 6 is a diagram illustrating a structure of a downlink subframe.

Referring to FIG. 6, maximum three (four) OFDM symbols located at the front of the first slot of the subframe correspond to a control region to which a control channel is allocated. The other OFDM symbols correspond to a data region to which a physical downlink shared channel (PDSCH) is allocated. Examples of downlink control channels used in the LTE system include a Physical Control Format Indicator Channel (PCFICH), a Physical Downlink Control Channel (PDCCH), and a Physical Hybrid ARQ Indicator Channel (PHICH). The PCFICH is transmitted from the first OFDM symbol of the subframe, and carries information on the number of OFDM symbols used for transmission of the control channel within the subframe. The PHICH carries HARQ ACK/NACK (hybrid automatic repeat request acknowledgement/negative-acknowledgement) signals in response to uplink transmission.

An eNB transmits, to a UE or UE group, information related to resource allocation of a paging channel (PCH) and downlink-shared channel (DL-SCH), which are transmission channel, an uplink scheduling grant, HARQ information, and a downlink assignment index (DAI) on a PDCCH. Herein, the DAI may represent a sequential order or counter value of the PDCCH. For simplicity, a value indicated by the DAI field of a DL grant PDCCH be referred to as a DL DAI, and a value indicated by the DAI field of a UL grant PDCCH will be referred to as a UL DAI.

The control information transmitted through the PDCCH will be referred to as downlink control information (DCI). The DCI includes resource allocation information for a user equipment or user equipment group. For example, the DCI includes uplink/downlink scheduling information, uplink transmission (Tx) power control command, etc.

The PDCCH may include transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission (Tx) power control commands of individual user equipments (UEs) within a random user equipment group, transmission (Tx) power control command, and activity indication information of voice over Internet protocol (VoIP). A plurality of PDCCHs may be transmitted within the control region. The user equipment may monitor the plurality of PDCCHs. The PDCCH is transmitted on aggregation of one or a plurality of continuous control channel elements (CCEs). The CCE is a logic allocation unit used to provide the PDCCH with a coding rate based on the status of a radio channel. The CCE corresponds to a plurality of resource element groups (REGs). The format of the PDCCH and the number of available bits of the PDCCH are determined depending on the number of CCEs. The base station determines a PDCCH format depending on the DCI which will be transmitted to the user equipment, and attaches cyclic redundancy check (CRC) to the control information. The CRC is masked with an identifier (for example, radio network temporary identifier (RNTI)) depending on usage of the PDCCH or owner of the PDCCH. For example, if the PDCCH is for a specific user equipment, the CRC may be masked with cell-RNTI (C-RNTI) of the corresponding user equipment. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI).

DCI formats will be described in more detail below.

DCI formats 0, 1, 1A, 1B, 1C, 1D, 2, 2A, 2B, 2C, 3, 3A and 4 are defined in LTE-A (Release 10). DCI formats 0, 1A, 3 and 3A are defined to have the same message size to reduce the number of times of blind decoding, which will be described later. The DCI formats may be divided into i) DCI formats 0 and 4 used for uplink scheduling grant, ii) DCI formats 1, 1A, 1B, 1C, 1D, 2, 2A, 2B and 2C used for downlink scheduling allocation, and iii) DCI formats 3 and 3A for power control commands according to purposes of use of control information to be transmitted.

DCI format 0 used for uplink scheduling grant may include a carrier indicator necessary for carrier aggregation, which will be described later, an offset (flag for format 0/format 1A differentiation) used to differentiate DCI formats 0 and 1A from each other, a frequency hopping flag that indicates whether frequency hopping is used for uplink PUSCH transmission, information about resource block assignment, used for a UE to transmit a PUSCH, a modulation and coding scheme, a new data offset (new data indicator) used to empty a buffer for initial transmission in relation to a HARQ process, a transmit power control (TPC) command for a scheduled PUSCH, information about a cyclic shift for a demodulation reference signal (DMRS) and OCC index, and a UL index and channel quality indicator request (CSI request) necessary for a TDD operation, etc. DCI format 0 does not include a redundancy version, unlike DCI formats relating to downlink scheduling allocation since DCI format 0 uses synchronous HARQ. The carrier indicator is not included in DCI formats when cross-carrier scheduling is not used.

DCI format 4, which is newly added to DCI formats in LTE-A Release 10, supports application of spatial multiplexing to uplink transmission in LTE-A. DCI format 4 has a larger message size DCI format 0 because it further includes information for spatial multiplexing. DCI format 4 includes additional control information in addition to control information included in DCI format 0. That is, DCI format 4 includes information on a modulation and coding scheme for the second transmission block, precoding information for multi-antenna transmission, and sounding reference signal (SRS) request information. DCI format 4 does not include an offset for differentiation between formats 0 and 1A because it has a larger size than DCI format 0.

DCI formats 1, 1A, 1B, 1C, 1D, 2, 2A, 2B and 2C for downlink scheduling allocation may be broadly divided into DCI formats 1, 1A, 1B, 1C and 1D, which do not support spatial multiplexing, and DCI formats 2, 2A, 2B and 2C, which support spatial multiplexing.

DCI format 1C supports only frequency contiguous allocation as compact frequency allocation and does not include the carrier indicator and redundancy version, compared to the other formats.

DCI format 1A is for downlink scheduling and random access. DCI format 1A may include a carrier indicator, an indicator that indicates whether downlink distributed transmission is used, PDSCH resource allocation information, a modulation and coding scheme, a redundancy version, a HARQ processor number for indicating a processor used for soft combining, a new data indicator used to empty a buffer for initial transmission in relation to a HARQ process, a TPC command for a PUCCH, an uplink index necessary for a TDD operation, etc.

DCI format 1 includes control information similar to that of DCI format 1A. DCI format 1 supports non-contiguous resource allocation, while DCI format 1A is related to contiguous resource allocation. Accordingly, DCI format 1 further includes a resource allocation header, and thus slightly increases control signaling overhead as a trade-off for an increase in flexibility of resource allocation.

Both DCI formats 1B and 1D further include precoding information, compared to DCI format 1. DCI format 1B includes PMI acknowledgement and DCI format 1D includes downlink power offset information. Most control information included in DCI formats 1B and 1D corresponds to that of DCI format 1A.

DCI formats 2, 2A, 2B and 2C basically include most control information included in DCI format 1A and further include information for spatial multiplexing. The information for spatial multiplexing includes a modulation and coding scheme for the second transmission block, a new data indicator, and a redundancy version.

DCI format 2 supports closed loop spatial multiplexing, and DCI format 2A supports open loop spatial multiplexing. Both DCI formats 2 and 2A include precoding information. DCI format 2B supports dual layer spatial multiplexing combined with beamforming and further includes cyclic shift information for a DMRS. DCI format 2C, which may be regarded as an extended version of DCI format 2B, supports spatial multiplexing for up to 8 layers.

DCI formats 3 and 3A may be used to complement the TPC information included in the aforementioned DCI formats for uplink scheduling grant and downlink scheduling allocation, namely, to support semi-persistent scheduling. A 1-bit command is used per UE in the case of DCI format 3, while a 2-bit command is used per UE in the case of DCI format 3A.

One of the DCI formats described above is transmitted through a PDCCH, and a plurality of PDCCHs may be transmitted in a control region. A UE may monitor the plurality of PDCCHs.

Figure 7:
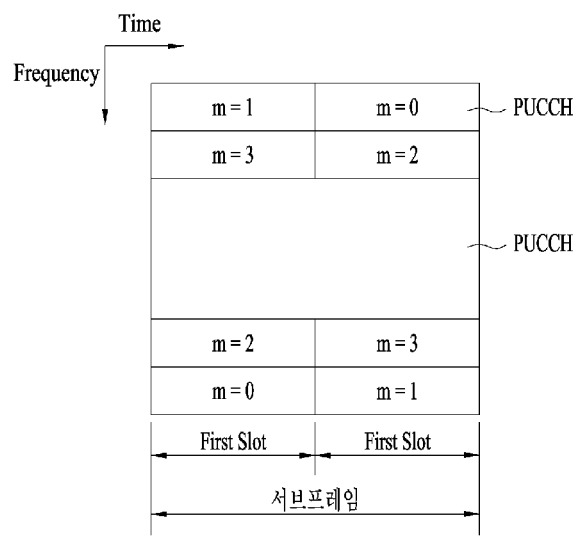
FIG. 7 illustrates the structure of an uplink subframe used in LTE.

FIG. 7 illustrates the structure of an uplink subframe used in LTE.

Referring to FIG. 7, an uplink (UL) subframe includes a plurality of (e.g., 2) slots. Each slot includes a different number of SC-FDMA symbols according to CP length. The UL subframe is divided into a data region and a control unit in the frequency domain. The data region includes a PUSCH and is used to transmit data signals such as voice. The control region includes a PUCCH and is used to transmit uplink control information (UCI). The PUCCH performs hopping across a slot boundary including an RB pair located at both ends of the data region in the frequency domain.

The PUCCH may be used to transmit control information described below.

Scheduling Request (SR): This is information used to request an uplink UL-SCH resource. This information is transmitted using an On-Off Keying (OOK) scheme.

HARQ ACK/NACK: This is a response signal for a downlink data packet on the PDSCH. This indicates whether a downlink data packet has been successfully received. As a response to a single downlink codeword, 1-bit ACK/NACK is transmitted. As a response to two downlink codewords, 2-bit ACK/NACK is transmitted.

Channel State Information (CSI): This is feedback information about a downlink channel. The CSI includes a channel quality indicator (CQI), and feedback information related to Multiple Input Multiple Output (MIMO) includes a rank indicator (RIA), a precoding matrix indicator (PMI), and a precoding type indicator (PTI). This information uses 20 bits per subframe.

The amount of UCI transmittable by a UE in a subframe depends on the number of SC-FDMAs available for transmission of the UCI. The SC-FDMAs available for transmission of the UCI refers to SC-FDMA symbols other than SC-FDMA symbols for transmission of a reference signal in a subframe. For a subframe in which a sounding reference signal (SRS) is configured, the last SC-FDMA symbol of the subframe is also excluded from the available symbols. The reference signal is used for coherent detection of the PUCCH.

Figure 8:
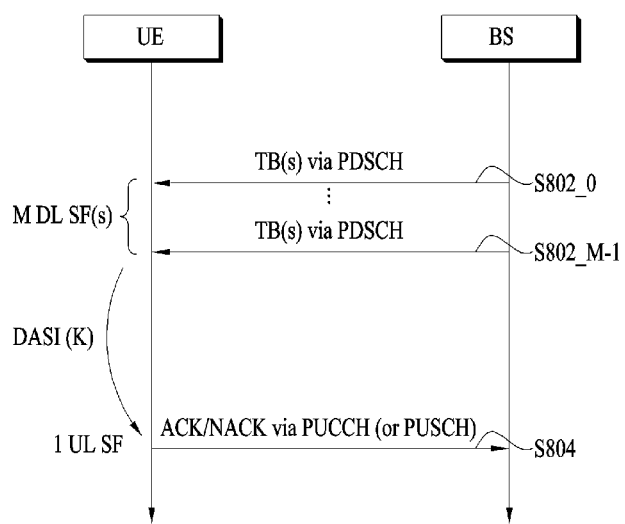
FIG. 8 illustrates a TDD UL ACK/NACK transmission procedure in a single cell situation.

FIG. 8 illustrates a TDD UL ACK/NACK transmission procedure in a single cell situation.

Referring to FIG. 8, a UE may receive one or more PDSCH signals in M DL subframes (SFs) (S802_0 to S802_M−1). Each PDSCH signal is used to transmit one or more (e.g., 2) transport blocks (TBs) (or codewords (CWs)) according to a transmission mode. In addition, although not shown, the UE may also receive a PDCCH signal requesting an ACK/NACK response, for example, a PDCCH signal (briefly, an SPS release PDCCH signal) indicating SPS release in steps S802_0 to S802_M−1. When a PDSCH signal and/or SPS release PDCCH signal are/is present in M DL subframes, the UE performs a procedure (e.g., ACK/NACK (payload) generation, ACK/NACK resource allocation, etc.) for transmitting the ACK/NACK and then, transmits the ACK/NACK in one UL subframe corresponding to the M DL subframes (S804). The ACK/NACK includes reception response information for the PDSCH signal and/or SPS release PDCCH signal of steps S802_0 to S802_M−1. The ACK/NACK is basically transmitted over PUCCH. If PUSCH transmission occurs at the ACK/NACK transmission time, however, the ACK/NACK is transmitted over the PUSCH. Various PUCCH formats of Table 2 may be used for ACK/NACK transmission. Further, various methods such as ACK/NACK bundling and ACK/NACK channel selection may be used to reduce the number of bits for ACK/NACK transmitted through a PUCCH format.

As described above, in TDD, ACK/NACK for data received in the M DL subframes is transmitted through one UL subframe (i.e., M DL SF(s):1 UL SF) and a relationship therebetween is given by a downlink association set index (DASI).

Table 3 below shows DASI (K::{k0, k1, . . . kM−1}) defined in LTE(-A). Table 3 shows an interval from a DL subframe associated with a UL subframe for transmission of ACK/NACK. Specifically, when PDSCH transmission and/or SPS release PDCCH are/is present in subframe n−k (k∈K), the UE transmits ACK/NACK corresponding to subframe n.

TABLE 3

| UL-DL Config-uration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |

TABLE 3-continued

| UL-DL Config-uration | Subframe n | | | | | | | | | |
|---|---|---|---|---|---|---|---|---|---|---|
| | 0 | 1 | 2 | 3 | 4 | 5 | 6 | 7 | 8 | 9 |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

If a plurality of the PDSCHs is transmitted to one UE in a plurality of DL subframes, an eNB transmits a plurality of PDCCHs one by one for each PDSCH. In this case, the UE transmits ACK/NACK for the plurality of PDSCHs over a PUCCH or PUSCH in one UL subframe. In the legacy LTE, methods for transmitting ACK/NACK for the plurality of PDSCHs used in the TDD mode in the legacy LTE or broadly divided into the following two methods:

1) ACK/NACK bits for a plurality of data units (e.g., PDSCH, SPS release PDCCH, etc.) are concatenated via a logic AND operation. For example, when all data units are successfully decoded, a Rx node (e.g., a UE) transmits an ACK signal. On the other hand, if any one of the data units fails to be decoded (or detected), the Rx node transmits a NACK signal or does not transmit any signal.

2) A UE receiving a plurality of PDSCHs occupies a plurality of PUCCH resources to perform ACK/NACK transmission. An ACK/NACK response to the plurality of data units is identified by a combination of PUCCH resources which are actually used for ACK/NACK transmission and the content (e.g., bit value) of the transmitted ACK/NACK.

In TDD, the following problems may arise when the UE transmits an ACK/NACK signal to a BS.

If the UE misses some of PDCCH(s) transmitted from the BS during an interval of several subframes, an error may be produced in generating ACK/NACK since the UE cannot recognize even the fact that a PDSCH corresponding to the missed PDCCH has been transmitted to the UE.

To address this error, the TDD system adds a downlink assignment index (DAI) to a PDCCH. The DAI represents an accumulated value (i.e., a count value) of PDCCH(s) indicating DL SPS release and PDCCH(s) corresponding to PDSCH(s) up to a current subframe in DL subframe(s) n–k (k∈K). For example, when 3 DL subframes correspond to one UL subframe, PDSCHs transmitted in 3 DL subframes are sequentially indexed (i.e., sequentially counted) and are delivered over a PDCCH for scheduling a PDSCH. The UE may recognize whether PDCCHs have been successfully received so far based on DAI information contained in the PDCCHs. For simplicity, the DAI contained in PDSCH-scheduling PDCCH and SPS release PDCCH is referred to as DL DAI, DAI-c(counter), or DAI.

Table 4 below shows values ($V_{DAI}^{DL}$) indicated by a DL DAI field.

TABLE 4

| DAI MSB, LSB | $V_{DAI}^{DL}$ | Number of subframes with PDSCH transmission and with PDCCH indicating DL SPS release |
|---|---|---|
| 0, 0 | 1 | 1 or 5 or 9 |
| 0, 1 | 2 | 2 or 6 |
| 1, 0 | 3 | 3 or 7 |
| 1, 1 | 4 | 0 or 4 or 8 |

MSB: Most significant bit.
LSB: Least significant bit.

Figure 9:
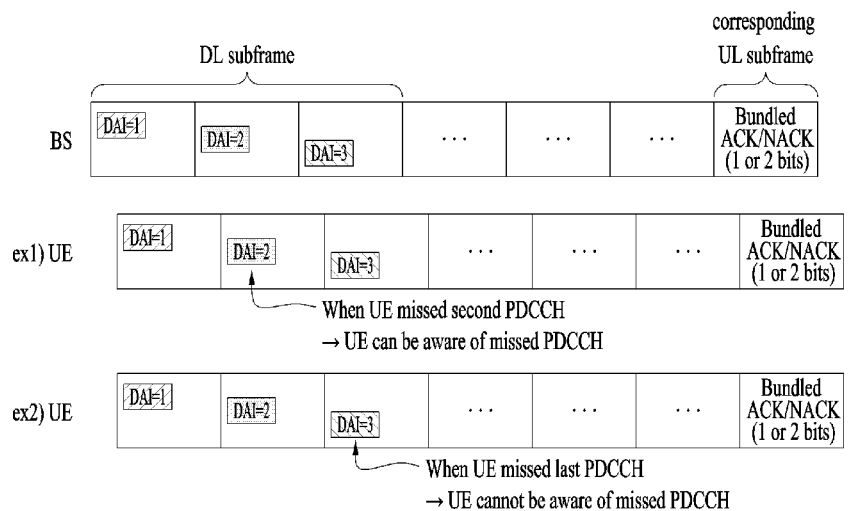
FIG. 9 illustrates exemplary ACK/NACK transmission using DL DAI.

FIG. 9 illustrates exemplary ACK/NACK transmission using DL DAI. In this example, it is assumed that the TDD system is configured in the form of 3 DL subframes:1 UL subframe. For simplicity, it is assumed that ACK/NACK is transmitted using a PUSCH resource. In legacy LTE, when ACK/NACK transmission over a PUSCH is implemented by transmitting 1-bit or 2-bit bundled ACK/NACK.

Referring to FIG. 9, as shown in Example 1, when the UE misses the second PDCCH, the UE may recognize that the second PDCCH is missed since the value of DL DAI of the third PDCCH is not identical to the number of PDCCHs which have been detected. In this case, the UE may process an ACK/NACK response to the second PDCCH as NACK (or NACK/DTX). On the other hand, as shown in example 2, when the last PDCCH is missed, the UE may not recognize that the last PDCCH is missed (i.e., DTX) because the value of DAI of a PDCCH that is lastly detected is identical to the number of PDCCHs which have been detected. Thus, the UE misrecognizes that only 2 PDCCHs are scheduled during a DL subframe period. In this case, the UE bundles only ACK/NACK corresponding to the first two PDCCHs, and thus an error is produced in feeding back ACK/NACK. To address this issue, the PUSCH-scheduling PDCCH (i.e., a UL grant PDCCH) includes a DAI field (for simplicity, a UL DAI field). The UL DAI field is a 2-bit field and indicates information about the number of scheduled PDCCHs.

Specifically, when $V_{DAI}^{UL} \neq (U_{DAI}+N_{SPS}-1)\bmod 4+1$, the UE generates NACK for all codewords according to a bundling procedure, assuming that at least one DL allocation is missed (i.e., DTX generation). Herein, $U_{DAI}$ denotes the total number of SPS release PDCCHs and DL grant PDCCHs detected in subframe n–k (k∈K) (see Table 3). $N_{SPS}$ denotes the number of SPS PDSCHs and is set to 0 or 1.

Table 5 below shows values ($V_{DAI}^{DL}$) indicated by a UL DAI field.

TABLE 5

| DAI MSB, LSB | $V_{DAI}^{UL}$ | Number of subframes with PDSCH transmission and with PDCCH indicating DL SPS release |
|---|---|---|
| 0, 0 | 1 | 1 or 5 or 9 |
| 0, 1 | 2 | 2 or 6 |
| 1, 0 | 3 | 3 or 7 |
| 1, 1 | 4 | 0 or 4 or 8 |

MSB: Most significant bit.
LSB: Least significant bit.

Figure 10:
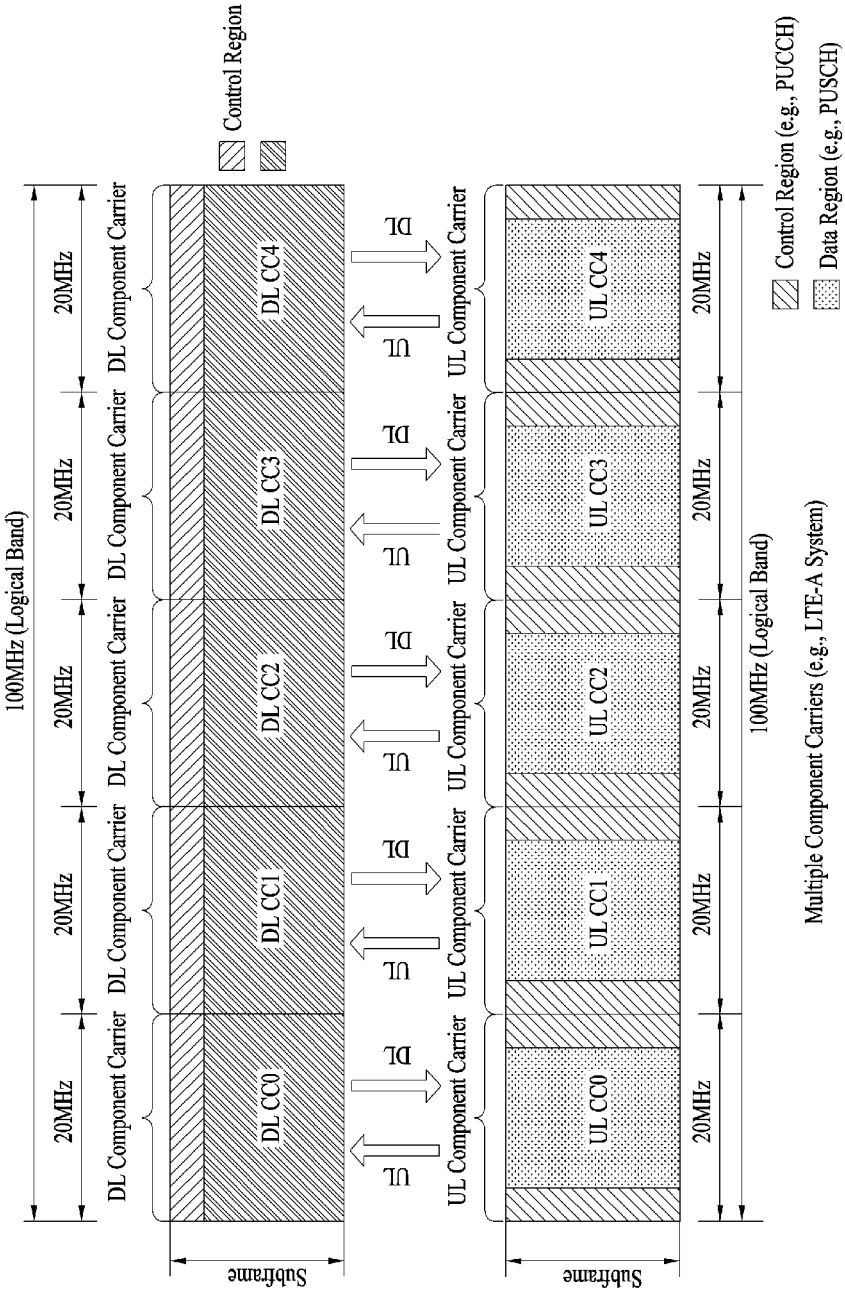
FIG. 10 illustrates a carrier aggregation (CA) communication system.

FIG. 10 illustrates a carrier aggregation (CA) communication system.

Referring to FIG. 10, a plurality of UL/DL component carriers (CCs) may be collected to support a wider UL/DL bandwidth. The term "component carrier (CC)" may be replaced with another equivalent term (e.g., carrier, cell, etc.). CCs may or may not be adjacent to each other in the frequency domain. The bandwidth of each CC may be independently determined Asymmetric carrier aggregation in which the number of UL CCs differs from that of DL CCs is also possible. Meanwhile, control information may be configured to be transmitted and received through a specific CC. This specific CC may be referred to as a primary CC (or an anchor CC), and the other CCs may be referred to as secondary CCs.

When cross-carrier scheduling (or cross-CC scheduling) is applied, a PDCCH for DL assignment may be transmitted on DL CC#0, and a corresponding PDSCH may be transmitted on DL CC#2. To ensure cross-CC scheduling, a carrier indicator field (CIF) may be introduced. In the PDCCH, presence of CIF may be semi-statically and UE-specifically (or UE group-specifically) indicated through higher layer signaling (e.g., RRC signaling). A baseline for PDCCH transmission is summarized below.

CIF Disabled: A PDCCH on a DL CC is assigned a PDSCH resource on the same DL CC or a PUSCH resource on one linked UL CC.
  No CIF
    Identical to LTE PDCCH structure (the same coding, same CCE-based resource mapping) and DCI format
CIF Enabled: A PDCCH on a DL CC can be assigned a PDSCH or PUSCH resource on a specific DL/UL CC among a plurality of aggregated DL/UL CCs, using a CIF
  An extended LTE DCI format having a CIF
    The CIF (when configured) is a fixed x-bit field (e.g., x=3)
    The location of the CIF (when configured) is fixed irrespective of the size of the DCI format.
    Reusing the LTE PDCCH structure (the same coding and same CCE-based resource mapping)

When a CIF is present, a base station may assign a PDCCH monitoring DL CC set to lower BD complexity on the UE. The PDCCH monitoring DL CC set includes at least one DL CC which is a part of all aggregated DL CCs, and the UE detects/decodes a PDCCH only on the at least one DL CC. That is, if the base station schedules a PDSCH/PUSCH for the UE, the PDCCH is transmitted through only the PDCCH monitoring DL CC set. The PDCCH monitoring DL CC set may be configured in a UE-specific, UE-group-specific or cell-specific manner. The term "PDCCH monitoring DL CC" may be replaced with another equivalent term such as "monitoring carrier" and "monitoring cell". In addition, a CC aggregated for the UE may be expressed as an equivalent term such as "serving CC," "serving carrier," and "serving cell".

Figure 11:
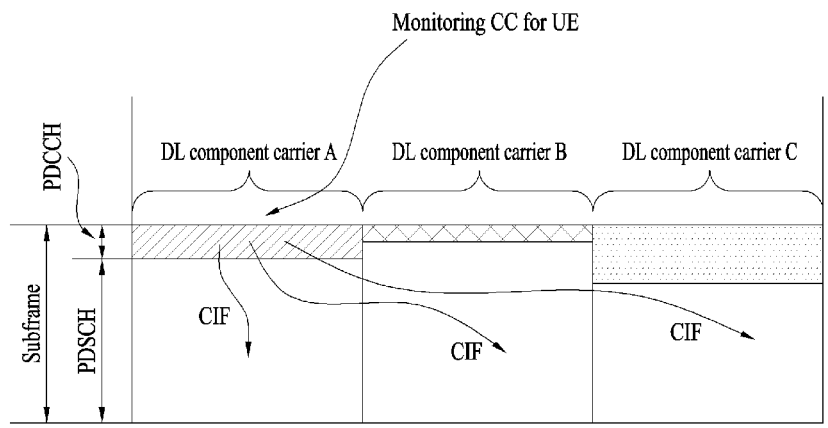
FIG. 11 illustrates scheduling performed when a plurality of carriers is aggregated.

FIG. 11 illustrates scheduling performed when a plurality of carriers is aggregated. It is assumed that 3 DL CCs have been aggregated. It is also assumed that DL CC A is configured as a PDCCH monitoring DL CC. DL CCs A to C may be referred to as serving CCs, serving carriers, serving cells, or the like. If the CIF is disabled, each DL CC may transmit only a PDCCH for scheduling the PDSCH thereof without a CIF according to the LTE PDCCH configuration. On the other hand, if the CIF is enabled by UE-specific (or UE-group-specific or cell-specific) higher layer signaling, not only a PDCCH for scheduling the PDSCH of DL CC A but also a PDCCH for scheduling the PDSCH of another CC may be transmitted on DL CC A (a monitoring DL CC) using the CIF. In this case, a PDCCH is not transmitted on DL CC B/C, which is not configured as a PDCCH monitoring DL CC. Accordingly, DL CC A (a monitoring DL CC) must include a PDCCH search space related to DL CC A, a PDCCH search space related to DL CC B and a PDCCH search space related to DL CC C. In this specification, it is assumed that a PDCCH search space is defined for each carrier.

As described above, LTE-A considers using the CIF in a PDCCH to perform cross-CC scheduling. Whether the CIF is used (namely, a cross-CC scheduling mode or non-cross-CC scheduling mode is supported) and switching between the modes may be semi-statically/UE-specifically configured through RRC signaling. After being subjected to the RRC signaling process, the UE may recognize whether the CIF is used in a PDCCH that is to be scheduled therefor.

Figure 12:
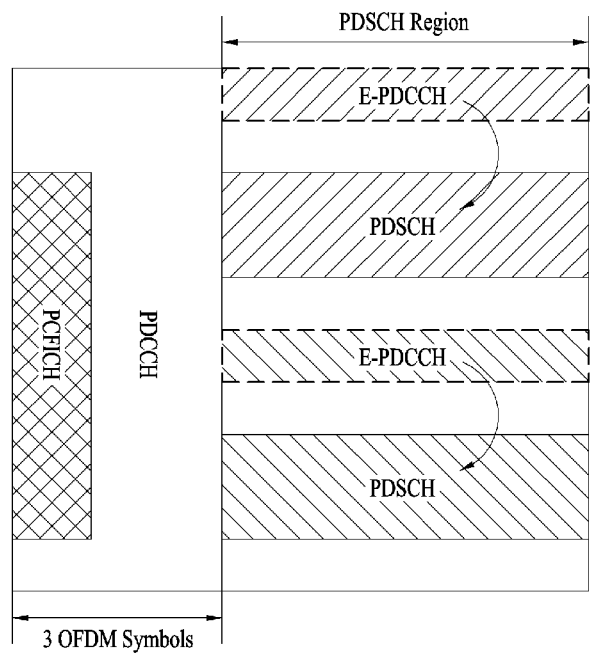
FIG. 12 illustrates an EPDCCH and a PDSCH scheduled by the EPDCCH.

FIG. 12 illustrates an EPDCCH and a PDSCH scheduled by the EPDCCH.

Referring to FIG. 12, for the EPDCCH, a part of the PDSCH region for transmitting data may be generally defined and used. A UE must perform blind decoding to detect presence of an EPDCCH thereof. The EPDCCH performs the same scheduling operation (i.e., controlling a PDSCH and a PUSCH) as performed by the legacy PDCCH, but may increase complexity when the number of UEs accessing a node such as the RRH since the number of EPDCCHs assigned in the PDSCH region increases and thus the number of times of blind decoding which a UE needs to perform increases.

Hereinafter, cooperative multipoint transmission/reception (CoMP) will be described.

Systems after LTE-A consider introducing a method to improve system performance by enabling cooperation among multiple cells. This method is called cooperative multipoint transmission/reception (CoMP). CoMP refers to a communication scheme in which two or more base stations, access points or cells cooperate in order to smoothly communicate with a specific UE. In the present invention, the terms base station, access point, and cell may have the same meaning.

Generally, in a multi-cell environment where the frequency reuse factor is 1, performance and average sector throughput of a UE positioned at a cell boundary may be lowered due to inter-cell interference (ICI). In order to attenuate such ICI, the legacy LTE system uses a simple passive technique such as fractional frequency reuse (FFR) through UE-specific power control to ensure that a UE positioned at the cell boundary exhibits proper throughput performance in an environment where the UE is subjected to interference. However, it may be more preferable to attenuate ICI or reuse ICI as a signal desired by the UE than to lower frequency resource use per cell. To achieve this object, a CoMP transmission technique may be applied.

Figure 13:
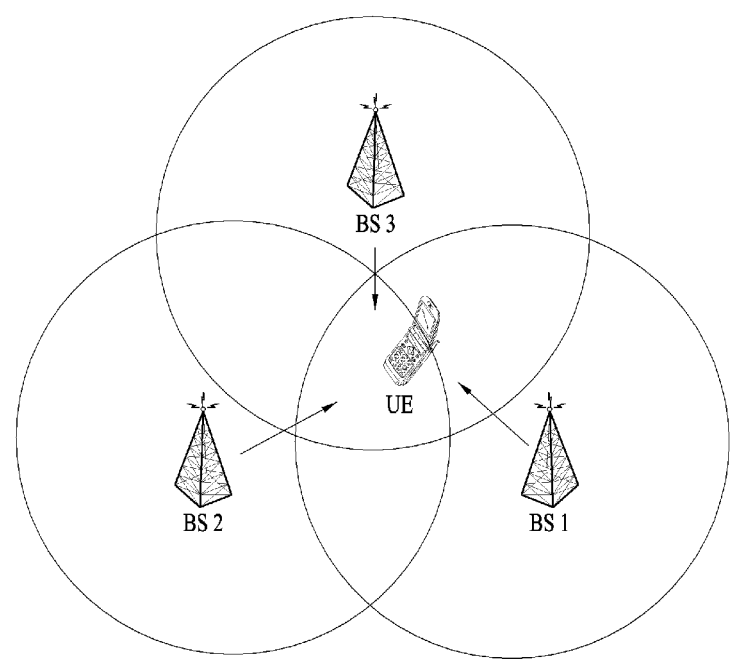
FIG. 13 shows an example of CoMP operation.

FIG. 13 shows an example of CoMP operation. Referring to FIG. 13, a wireless communication system includes a plurality of bass stations BS1, BS2 and BS3 and a UE which perform CoMP. The base stations BS1, BS2 and BS3 performing CoMP may cooperate, thereby efficiently transmitting data to the UE. CoMP may be divided into two techniques depending on whether or not data is transmitted from a base station performing CoMP:
  Joint Processing (-CoMP joint processing (CoMP-JP))
  CoMP cooperative scheduling (CoMP-CS)/cooperative beamforming (CB)

In CoMP-JP, base stations performing CoMP transmit data to one UE simultaneously, and the UE improves reception performance by combining signals from the base stations. That is, according to the CoMP-JP technique, each point (base station) in a CoMP cooperation unit may use data. The CoMP cooperation unit refers to a set of base stations used for a cooperative transmission scheme. The JP scheme may be divided into joint transmission and dynamic cell selection.

Joint transmission refers to a technique of simultaneously transmitting PDSCHs from a plurality of transmission points (a part or the entirety of a CoMP cooperation unit). That is, a plurality of transmission points may transmit data to a single UE simultaneously. With the joint transmission technique, the quality of a received signal may be coherently or non-coherently improved, and interference with other UEs may be actively eliminated.

Dynamic cell selection is a technique of transmitting a PDSCH from one transmission point (of a CoMP cooperation unit) at a time. That is, one transmission point transmits data to a single UE at a specific time, while the other transmission points in the CoMP cooperation unit do not transmit data to the UE at this time. A transmission point to transmit data to a UE may be dynamically selected.

On the other hand, when CoMP-CS is used, data is transmitted from one base station to a UE at a certain moment, and scheduling or beamforming is performed such that interference with the other base stations is minimized That is, when the CS/CB technique is used, CoMP cooperation units may cooperatively perform beamforming for data transmission to a single UE. While data is transmitted to the UE only from a serving cell, user scheduling/beamforming may be determined through coordination among cells in the CoMP cooperation unit.

In the case of uplink, CoMP reception refers to reception of a signal transmitted through cooperation among a plurality of geographically separated transmission points. CoMP schemes applicable to uplink may be classified into joint reception (JR) and coordinated scheduling/beamforming (CS/CB).

JR refers to a technique of a plurality of reception points receiving a signal transmitted through a PUSCH. The CS/CB refers to a technique of only one point receiving a PUSCH, and user scheduling/beamforming is determined by coordination among the cells of a CoMP unit.

Figure 14:
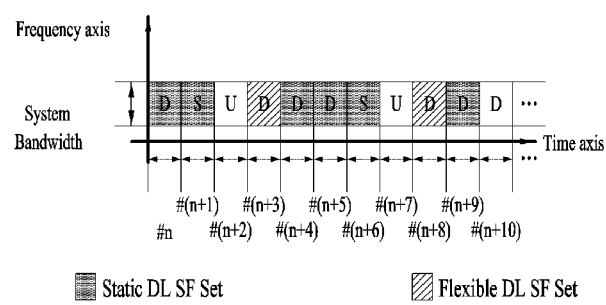
FIG. 14 illustrates dynamically switching the usage of a radio resource in the environment of a TDD system.

FIG. 14 illustrates a case where a specific cell changes a part of UL resources (i.e., UL SFs) for use in DL communication in a TDD system as downlink load increases in the system. In FIG. 14, a UL/DL configuration established through an SIB is assumed to be UL/DL #1 (i.e., DSUUDDSUUD). It is illustrated in FIG. 14 that UL SF #(n+3) and UL SF #(n+8) are changed for downlink communication through a predefined signal (e.g., a physical/higher layer signal or a system information signal).

Based on the description given above, a description will be given of efficiently interpreting/using the "UL INDEX field" and/or "UL DAI (UL downlink assignment index)" in a specific DCI format (e.g., DCI format 0 and/or DCI format 4) when a cell dynamically changes configuration of radio resources according to the load state of the system.

Hereinafter, for simplicity, the present invention will be described based on the 3GPP LTE system. However, the present invention is also applicable to systems other than the 3GPP LTE system. Embodiments of the present invention are applicable in the case where a resource on a specific cell (or a component carrier (CC)) is dynamically changed according to the load applied to the system in an environment where a carrier aggregation (CA) technique is employed. In addition, Embodiments of the present invention may be extended and thus applicable in the case where use of a radio resource is dynamically changed in a TDD system or an FDD system.

In the legacy LTE TDD system, whether to interpret a specific field (i.e., 2-bit field) in DCI format 0 and/or DCI format 4 as being used for INDEX information or UL DAI information is determined depending on whether a SIB1 information-based UL-DL configuration (i.e., PCell) related to a cell (or component carrier) on which the DCI format is transmitted or a RadioResourceConfigCommonSCell IE information-based UL-DL configuration (i.e., SCell) is set to UL-DL configuration #0. That is, if the configuration is set to UL-DL configuration #0, the field is interpreted as being used for INDEX information. Otherwise, the field is interpreted as being used for UL DAI information.

In addition, in a case where a specific cell dynamically changes configuration of a radio resource according to the load state of the system, there are provided an SIB1 information-based UL-DL configuration or RadioResourceConfigCommonSCell IE information-based UL-DL configuration, UL-DL configuration related to a DL HARQ reference configuration, a UL-DL configuration related to a UL HARQ reference configuration, and a currently (re-)established UL-DL configuration in the perspective of a specific UE (eIMTA UE).

In this situation, a UL-DL configuration to form the basis on which the specific field (i.e., 2-bit field) in DCI format 0/4 is to be interpreted as being used for UL INDEX information or UL DAI information becomes ambiguous for the UE (eIMTA UE). Herein, the UL DAI denotes "the total number of subframes related to (transmission of) the PDSCH transmitted within a pre-defined handling window and subframes related to be PDCCH/EPDCCH transmission for delivering DL SPS release information". The UE may receive the UL DAI information and (re-)check whether PDCCH/EPDCCH reception is missed within the pre-defined bundling window. In addition, the UE may receive UL INDEX having a specific value (e.g., 11), thereby recognizing "whether one piece of UL DCI information (i.e., DCI format 0/4) schedules one PUSCH or multiple (i.e., 2) PUSCHs".

For example, in the case where a specific cell dynamically changes configuration of a resource according to the load state of the system, if i) the UL HARQ reference configuration and DL HARQ reference configuration are set to UL-DL configuration #0 and UL-DL configuration #2 (one of UL-DL configurations #2, #4 and #5), ii) UL HARQ reference configuration and (re-)established UL-DL configuration are set to UL-DL configuration #0 and UL-DL configuration #2 respectively, for a specific UE (eIMTA UE) performing communication with the cell, UL INDEX information and/or UL DAI information on DCI format 0/4 are needed to ensure efficient UL-DL communication of the UE. Hereinafter, embodiments of the present invention for addressing the aforementioned issue will be described.

1. First Embodiment

According to a first embodiment, if the DL HARQ reference configuration is set to one of UL-DL configurations #2, #4 and #5 (i.e., when different UL-DL configurations are provided) in a situation where the UL HARQ configuration (or SIB1 information-based UL-DL configuration) is set to UL-DL configuration #0, a field for a pre-defined bit size may be added to DCI format 0/4.

Herein, the added field may be configured to be used for transmission of UL DAI information (UL INDEX information). Thereby, the field related to transmission of the UL INDEX information and the field related to transmission of UL DAI information may coexist in DCI format (0/4). Further, i) information about the configuration of the added field or ii) information about the bit size of the added field may be announced to the UE by a BS through a pre-defined signal (e.g., a physical layer signal or higher layer signal) or be configured to be implicitly recognized according to a pre-defined rule.

Further, adding the field for the pre-defined bit size (e.g., 2 bits) may be employed only when the DCI format is transmitted through a UE-specific search space (USS).

2. Second Embodiment

According to a second embodiment, if the DL HARQ reference configuration is set to one of UL-DL configurations #2, #4 and #5 (i.e., when different UL-DL configurations are provided) in a situation where the UL HARQ configuration (or SIB1 information-based UL-DL configuration) is set to UL-DL configuration #0, the specific field (e.g., 2-bit field) of DCI format 0/4 may be (re-)interpreted based on at least one (i.e., some or all) of Rule #A to Rule #H given below.

The rules according to this embodiment may be defined to be applied only when DCI format 0/4 is transmitted through a UE common search space (CSS). That is, the first embodiment may be employed when DCI format 0/4 is transmitted through the USS.

2. 1. Rule #A

At least one part (i.e., some or all) of states related to the specific field on DCI format 0/4 shall be subjected to interpretations of UL INDEX information in the same form as used in the conventional cases, and preset (or pre-signaled) specific value(s) shall be assumed for UL DAI information item(s). For example, the content of Table 6 defined below in relation to a UL grant according to setting of the value of UL INDEX in the 8.0 or higher version of 3 GBP TS 36.213, which is an LTE standard document, or a PHICH-based PUSCH transmission timeline may be applied as described below.

TABLE 6

[CASE #A] For TDD UL/DL configuration 0 and normal HARQ operation the UE shall upon detection of a PDCCH/EPDCCH with uplink DCI format and/or a PHICH transmission in subframe n intended for the UE, adjust the corresponding PUSCH transmission in subframe n + k if the MSB of the UL index in the PDCCH/EPDCCH with uplink DCI format is set to 1 or PHICH is received in subframe n = 0 or 5 in the resource corresponding to $I_{PHICH} = 0$, as defined in clause 9.1.2 [1] with k given in Table 8-2 [1].
[CASE #B] If, for TDD UL/DL configuration 0 and normal HARQ operation, the LSB of the UL index in the DCI format 0/4 is set to 1 in subframe n or a PHICH is received in subframe n = 0 or 5 in the resource corresponding to $I_{PHICH} = 1$, as defined in clause 9.1.2 [1], or PHICH is received in subframe n = 1 or 6, the UE shall adjust the corresponding PUSCH transmission in subframe n + 7.
[CASE #C] If, for TDD UL/DL configuration 0, both the MSB and LSB of the UL index in the PDCCH/EPDCCH with uplink DCI format are set in subframe n, the UE shall adjust the corresponding PUSCH transmission in both subframes n + k and n + 7, with k given in Table 8-2 [1].

That is, [CASE #A], [CASE #B] or [CASE #C] of Table 6 may be applied in the same form as in the legacy LTE system (wherein [CASE #C] represents a case where one piece of UL DCI information (i.e., DCI format 0/4) schedules multiple (i.e., 2) PUSCHs), and UL DAI information may be assumed to have a pre-defined (or signaled) specific value.

Herein, at least one part (i.e., some or all) of the states related to the specific field of DCI format 0/4 may be subjected to the interpretations of UL INDEX information in the same form as used in the conventional cases, and at least one part (i.e., some or all) of i) UL DAI information items configured (or signaled) for the respective states or ii) UL DAI information items configured (or signaled) for each UL INDEX information may differ from each other. On the contrary, at least one part (i.e., some or all) of the states related to the specific field of DCI format 0/4 may be subjected to interpretations of the UL INDEX information in the same form as in the conventional cases, and at least one part (i.e., some or all) of i) UL DAI information items configured (or signaled) for the respective states or ii) UL DAI information items configured (or signaled) for each UL INDEX information item may be identical to each other.

Specifically, when the bit size of the specific field is 2 bits, 4 states are given. The states are subjected to interpretations of UL INDEX information (e.g., [CASE #A], [CASE #B], and [CASE #C] of Table 6) in the same form as in the conventional cases, while UL DAI information items configured (or signaled) for the respective states or UL DAI information items configured (or signaled) for each UL INDEX information item may correspond to one of the cases of i) "[00]→'UL DAI=1'", "[01]→'UL DAI=2'", "[10]→'UL DAI=3'", "[11]→'UL DAI=4/0'" (namely, different UL DAI information items are configured for the respective states), ii) "[00]→'UL DAI=2'", "[01]→'UL DAI=2'", "[10]→'UL DAI=2'", "[11]→'UL DAI=2'" (namely, the same UL DAI information items are configured for the respective states), and iii) "[00]→'UL DAI=2'", "[01]→'UL DAI=2'", "[10]→'UL DAI=4/0'", "[11]→'UL DAI=4/0'" (namely, the same UL DAI information is configured for some of the states) (wherein 'A→B' denotes that B is indicated in the case of A). This may be interpreted as meaning that a value for interpreting the specific field as being used for UL INDEX information and a value for interpreting the specific field as being used for the UL DAI information are simultaneously mapped to one state related to the specific field (i.e., the 2-bit field used for UL INDEX/ UL DAI) of DCI format 0/4.

As another example, when the bit size of the specific field is 2 bits, 4 states are given. The states are subjected to interpretations of UL INDEX information (e.g., [CASE #A], [CASE #B], and [CASE #C] of Table 6) in the same form as in the conventional cases, while additionally configured UL DAI information items may be (restrictively) designated only for states (e.g., [10], [01], [11]) having actually valid defined/mapped UL data channel (PUSCH) transmission timeline information (or UL INDEX information). Herein, the additionally configured UL DAI information may correspond to one of the cases of i) "[01]→'UL DAI=1'", "[10]→'UL DAI=2'", "[11]→'UL DAI=⅘'" (namely, the same UL DAI information is configured or ii) "[01]→'UL DAI=2'", "[10]→'UL DAI=2'", "[11]→'UL DAI=2'" (namely, different UL DAI information items are configured) or iii) "[01]→'UL DAI=2'", "[10]→'UL DAI=2'", "[11]→'UL DAI=4/0'" (namely, the same UL DAI information is configured for some of the states) (wherein 'A→B' denotes that B is indicated in the case of A).

2. 2. Rule #B

At least one part (i.e., some or all) of states related to the specific field in DCI format 0/4 shall be subjected to interpretations of UL DAI information in the same form as used in the conventional cases, and preset (or pre-signaled) specific value(s) shall be assumed for UL INDEX information item(s).

Herein, at least one part (i.e., some or all) of the states related to the specific field of DCI format 0/4 may be subjected to the interpretations of UL DAI information in the same form as used in the conventional cases, and at least one part (i.e., some or all) of UL INDEX information items configured (or signaled) for the respective states or UL INDEX information items configured (or signaled) for each UL DAI information item may differ from each other. On the contrary, at least one part (i.e., some or all) of the states related to the specific field of DCI format 0/4 may be subjected to interpretations of the UL DAI information in the same form as in conventional cases, and at least one part (i.e., some or all) of UL INDEX information items configured (or signaled) for the respective states or UL INDEX information items configured (or signaled) for each UL DAI information item may be identical to each other.

Specifically, when the bit size of the specific field is 2 bits, 4 states are given. The states are subjected to interpretations of UL INDEX information (e.g., "[00]→'UL DAI=1'", "[01]→'UL DAI=2'", "[10]→'UL DAI=3'", "[11]→'UL DAI=4'") in the same form as in the conventional cases, while UL INDEX information items configured (or signaled) for the respective states or UL INDEX information items configured (or signaled) for each UL DAI information item may correspond to one of the cases of i) "[00]→'UL INDEX=[00]'", "[01]→'UL INDEX=[01]'", "[10]→'UL INDEX=[10]'", "[11]→'UL INDEX=[11]'" (namely, different UL INDEX information items are configured for the respective states) or ii) "[00]→'UL INDEX=[11]'", "[01]→'UL INDEX=[11]'", "[10]→'UL INDEX=[11]'", "[11]→'UL INDEX=[11]'" (namely, the same UL INDEX information items are configured for the respective states), and iii) "[00]→'UL INDEX=[10]'", "[01]→'UL INDEX=[10]'", "[10]→'UL INDEX=[11]'", "[11]→'UL INDEX=[11]'" (namely, the same UL INDEX information is configured for some of the states) (wherein 'A→B' denotes that B is indicated in the case of A).

As another example, when the bit size of the specific field is 2 bits, 4 states are given. The states are subjected to interpretations of UL DAI information (e.g., "[00]→'UL DAI=1'", "[01]→'UL DAI=2'", "[10]→'UL DAI=3'", "[11]→'UL DAI=4'") in the same form as in the conventional cases, while additionally configured UL INDEX information items may be (restrictively) designated only for states (e.g., [10], [01], [11]) having actually valid defined/mapped UL data channel (PUSCH) transmission timeline information or UL INDEX information. For example, the additionally configured UL INDEX information may correspond to one of the cases of i) "[01]→'UL INDEX=[01]'", "[10]→'UL INDEX=[10]'", "[11]→'UL INDEX=[11]'" (namely, different UL INDEX information items are configured) or ii) "[01]→'UL INDEX=[11]'", "[10]→'UL INDEX=[11]'", "[11]→'UL INDEX=[11]'" (namely, the same UL INDEX information items are configured) or iii) "[01]→'UL INDEX=[10]'", "[10]→'UL INDEX=[10]'", "[11]→'UL INDEX=[11]'" (namely, the same UL INDEX information is configured for some of the states) (wherein 'A→B' denotes that B is indicated in the case of A).

As another example, when Rule #A and Rule #B related to the second embodiment are applied, if the specific field is assigned to one state, a corresponding specific UL DAI value or specific UL DAI information is assumed, and accordingly a cell (or BS) may pre-transmit PDCCHs/EPDCCHs for delivering i) a PDSCH and/or ii) DL SPS release information within a pre-defined bundling window, the number of PDCCHs/EPDCCHs being consistent with the specific UL DAI value or specific UL DAI information. That is, the total number of PDCCHs/EPDCCs for delivering i) a PDSCH and/or ii) DL SPS release information which are received by the UE within a pre-defined bundling window may coincide with the value of the specific UL DAI value.

Further, information about interpretation of at least one part (i.e., some or all) of the states related to the specific field may be delivered through a signal (e.g., a physical layer signal or higher layer signal) predefined between the BS and the UE or be configured to be implicitly recognized through a predefined rule.

2. 3. Rule #C

Some of the multiple states related to the specific field of DCI format 0/4 may be configured to be (re-)interpreted as being used for UL INDEX information, and the other states may be configured to be (re-)interpreted as being used for UL DAI information.

As a specific example, when the bit size of the specific field is 2 bits, 4 states are given. [10], [01], and [11] may be interpreted as UL INDEX information as in the conventional cases, and respectively interpreted as corresponding to [CASE #A], [CASE #B] and [CASE #C] of Table 6 (wherein [CASE #C] represents a case where one piece of UL DCI information (i.e., DCI format 0/4) schedules multiple (i.e., 2) PUSCHs). On the other hand, [00] may be interpreted as UL DAI information and be configured to be interpreted as a pre-defined (or signaled) value of K (e.g., one or 4/0). As another example, when the bit size of the specific field is 2 bits, 4 states may be given, and [10] and [11] may be interpreted as UL INDEX information as in the conventional cases and respectively configured to be interpreted as [CASE #A] and [CASE #C] of Table 6. On the other hand, [01] and [00] may be interpreted as UL DAI information and be configured to be interpreted as a pre-defined (or signaled) K value (e.g., 1) and L value (e.g., 4/0). Further, information about interpretation of a state of the specific field may be delivered to the UE by the BS through a predefined signal (e.g., a physical layer signal or higher layer signal) or be configured to be implicitly recognized according to a pre-defined rule.

As a specific example of Rule #C, one bit (e.g., the first bit) of the specific field (i.e., the 2-bit field used for UL INDEX/UL DAI) of DCI format 0/4 may be used to designate UL data channel (PUSCH) transmission subframe(s), and the other bit (e.g., the second bit) of the specific field may be used to designate the number of DL subframes in which a DL data channel (PDSCH) is received/the number of DL subframes in which DL SPS release-related (E)PDCCH is received.

As another example, the first bit may be used to designate the number of DL subframes in which the DL data channel is received/the number of DL subframes in which DL SPS release-related (E)PDCCH is received, and the second bit may be used to designate UL data channel (PUSCH) transmission subframe(s).

2. 3. 1. Example #1 of Rule #C

If the first bit is set to "0", this may be interpreted as meaning that the UL data channel is transmitted only in one UL subframe (e.g., a UL subframe having a fixed configuration or a UL subframe on a DL HARQ reference configuration) according to the HARQ timeline of the UL HARQ reference configuration. On the other hand, if the first bit is set to "1", this may be interpreted as meaning that the UL data channel is transmitted in 2 UL subframes (e.g., a UL subframe having a fixed configuration and a UL subframe having a changeable configuration) (namely, being considered to correspond to [CASE #C] of Table 6) according to the HARQ timeline of the UL HARQ reference configuration.

2. 3. 2. Example #2 of Rule #C

If the second bit is set to "0", the number of DL subframes in which a DL data channel (PDSCH) is received/the number of DL subframes in which DL SPS release-related (E)PDCCH is received may be interpreted as being set to 0 (or a pre-defined (or signaled) value) among M subframes associated with a UL subframe in which UL ACK/NACK transmission is performed for a DL subframe in which a corresponding DCI format is received according to the DL HARQ reference configuration (wherein M may be interpreted as i) a bundling window size, ii) the value of M given when a channel selection table is referenced, or iii) the maximum number of DL subframes associated with a specific UL subframe, wherein the M subframes include a DL subframe in which the DCI format is received, and the UL ACK/NACK for the DL data channels (PDSCHs) received in the M subframes are all transmitted through the UL subframe.

Further, if the second bit is set to "1", the number of DL subframes in which a DL data channel (PDSCH) is received/ the number of DL subframes in which the DL SPS release-related (E)PDCCH is received among M subframes associated with a UL subframe in which the UL ACK/NACK transmission is performed for DL subframes in which a corresponding DCI format is received according to the HARQ timeline of the DL HARQ reference configuration may be assumed to be a pre-defined (or signaled) value. For example, if the second bit is set to "1", the number of DL subframes in which a DL data channel (PDSCH) is received/the number of DL subframes in which the DL SPS release-related (E)PDCCH is received among M subframes associated with a UL subframe in which the UL ACK/NACK transmission is performed for DL subframes in which a corresponding DCI format is received according to the HARQ timeline of the DL HARQ reference configuration may be assumed to be the maximum value M.

As a specific example, there is a case where SIB-based UL-DL configuration is UL-DL configuration #0 (i.e., the UL HARQ reference configuration), the DL HARQ reference configuration is UL-DL configuration #2, and a UL-DL configuration based on a currently (re-)established reconfiguration message is UL-DL configuration #1. In this case, if the DCI format is received in DL SF #1, and the second bit is set to "1", it may be assumed that the number of DL subframes in which the DL data channel (PDSCH) is received/the number of DL subframes in which the SPS release-related (E)PDCCH is received is 4 among 4 subframes (i.e., SF #0, SF #1, SF #3, SF #9) associated with a UL subframe (i.e., UL SF #7) in which UL ACK/NACK transmission is performed for a DL subframe in which the DCI format is received.

As another example, if the second bit is set to "1", it may be assumed that the number of DL subframes in which the DL data channel (PDSCH) is received/the number of DL subframes in which the DL SPS release-related (E)PDCCH is received among M subframes associated with a UL subframe in which UL ACK/NACK transmission is performed for a DL subframe in which the DCI format is received according to the HARQ timeline of the DL HARQ reference configuration is the maximum number of subframes actually used for downlink.

Specifically, there is a case where the SIB-based UL-DL configuration is UL-DL configuration #0 (i.e., the UL HARQ reference configuration), the DL HARQ reference configuration is UL-DL configuration #2, and a UL-DL configuration based on a currently (re-)established reconfiguration message is UL-DL configuration #1. In this case, if the DCI format is received in DL SF #1, and the second bit is set to "1", it may be assumed that the number of DL subframes in which the DL data channel (PDSCH) is received/the number of DL subframes in which the DL SPS release-related (E)PDCCH is received is 3 because the maximum number of subframes (i.e., DL SFs #0, #1 and #9) actually used for downlink among the 4 subframes associated with a UL subframe (i.e., UL SF #7) in which UL ACK/NACK transmission is performed for a DL subframe in which the DCI format is received is 3.

As another example, if the second bit is set to "1", it may be assumed that the number of DL subframes in which the DL data channel (PDSCH) is received/the number of DL subframes in which the DL SPS release-related (E)PDCCH is received among M subframes associated with a UL subframe in which UL ACK/NACK transmission is performed for a DL subframe in which the corresponding DCI format is received according to the HARQ timeline of the DL HARQ reference configuration is i) the number of previous subframes including (or not including) the time at which the DCI format (i.e., the UL scheduling information) is received among the M subframes or ii) the number of subframes which are previous subframes including (or not including) the time at which the DCI format (i.e., the UL scheduling information) is received and are actually used for downlink among the M subframes.

2. 3. 3. Example #3 of Rule #C

If the second bit is set to "1", the number of DL subframes in which the DL data channel (PDSCH) is received/the number of DL subframes in which the DL SPS release-related (E)PDCCH is received that is assumed among M subframes associated with a UL subframe in which UL ACK/NACK transmission is performed for a DL subframe in which a corresponding DCI format is received according to the HARQ timeline of the DL HARQ reference configuration may be configured to be differently applied according to setting of the first bit (wherein the M subframes include the DL subframe in which the DCI format is received, and all UL ACK/NACK for the DL data channels (PDSCHs) received in the M subframes is transmitted through the corresponding UL subframe).

For example, if the first bit is set to "0" (e.g., the UL data channel is transmitted only in a DL subframe having a fixed configuration according to the HARQ timeline of the UL HARQ reference configuration), it may be assumed that the number of DL subframes in which the DL data channel (PDSCH) is received/the number of DL subframes in which the DL SPS release-related (E)PDCCH is received among the M subframes associated with a UL subframe in which UL ACK/NACK transmission is performed for a DL subframe in which a corresponding DCI format is received is the maximum value M.

On the other hand, if the first bit is set to "1" (e.g., the UL data channels are transmitted in 2 UL subframes (e.g., a UL subframe having a fixed configuration and a UL subframe having a changeable configuration) according to the HARQ timeline of the UL HARQ reference configuration), it may be assumed that the number of DL subframes in which the DL data channel (PDSCH) is received/the number of DL subframes in which the DL SPS release-related (E)PDCCH is received among the M subframes associated with a UL subframe in which UL ACK/NACK transmission is performed for a DL subframe in which the corresponding DCI format is received is the maximum number of subframes actually used for downlink.

2. 3. 4. Example #4 of Rule #C

As an example of application of at least one of Examples #1 to #3 of Rule #C, suppose that the specific field (i.e., the 2-bit field used for UL INDEX/EU DAI) of DCI format 0/4 is set to "[10]".

In this case, the UE transmits each UL data channel in two UL subframes (e.g., a UL subframe having a fixed configuration and a UL subframe having a changeable configuration) according to the HARQ timeline of the UL HARQ reference configuration (namely, performs an operation similar to similar to [CASE #C] of Table 6).

In addition, the UE transmits UL ACK/NACK information by piggybacking the information on a UL data channel which is transmitted first in order, considering that the number of DL subframes in which the DL data channel (PDSCH) is received/the number of DL subframes in which the DL SPS release-related (E)PDCCH is received among the M subframes associated with a UL subframe in which the UL ACK/NACK transmission is performed for a DL subframe in which a corresponding DCI format is received according to the HARQ timeline of the DL HARQ reference configuration (wherein the M subframes include the DL subframe in which the DCI format is received, and all the UL ACK/NACK for the DL data channels (PDSCH) received in the M subframes is transmitted through the corresponding UL subframe) is 0 (or a pre-defined (or signaled) value). Alternatively, the ACK/NACK information may not be piggybacked on the UL data channel transmitted first in order (which may be effective, for example, in the case where the number of DL subframes in which the DL data channel (PDSCH) is received/the number of DL subframes in which the DL SPS release-related (E)PDCCH is received among the M subframes is considered to be 0).

As another example, suppose that the specific field (i.e., the 2-bit field used for UL INDEX/UL DAI) of DCI format 0/4 is set to "[11]".

In this case, the UE transmits UL data channels respectively in 2 UL subframes (e.g., a UL subframe having a fixed configuration and a UL subframe having a changeable configuration) according to the HARQ timeline of the UL HARQ reference configuration (namely, performs a similar operation as in [CASE #C] of Table 6).

Then, the UE transmits UL ACK/NACK information by piggybacking the UL ACK/NACK information on a UL data channel transmitted first in order, considering that the number of DL subframes in which the DL data channel is received/the number of DL subframes in which the DL SPS release-related (E)PDCCH is received among the M subframes associated with a UL subframe in which the UL ACK/NACK transmission is performed for a DL subframe in which a corresponding DCI format is received according to the HARQ timeline of the DL HARQ reference configuration is the maximum value M.

As another example, suppose that the specific field (i.e., the 2-bit field used for UL INDEX/UL DAI) of DCI format 0/4 is set to "[01]".

In this case, the UE transmits a UL data channel only in one UL subframe (e.g., a UL subframe having a fixed configuration or a UL subframe on the DL HARQ reference configuration) according to the HARQ timeline of the UL HARQ reference configuration (namely, performs a similar operation to [CASE #A] or [CASE #B] of Table 6).

Then, the UE transmits UL ACK/NACK information by piggybacking the UL ACK/NACK information on a UL data channel transmitted first in order, considering that the number of DL subframes in which the DL data channel is received/the number of DL subframes in which the DL SPS release-related (E)PDCCH is received among the M subframes associated with a UL subframe in which the UL ACK/NACK transmission is performed for a DL subframe in which a corresponding DCI format is received according to the HARQ timeline of the DL HARQ reference configuration is the maximum value M.

In the examples described above, both interpretation of the specific field as being used for the UL INDEX information and interpretation of the specific field as being used for the UL DAI information may be viewed as being mapped together (or simultaneously) to one state related to the specific field (i.e., the 2-bit field used for UL INDEX/UL DAI) of DCI format 0/4.

2. 4. Rule #D

Configuration of the specific field (i.e., the 2-bit field used for UL INDEX/UL DAI) of DCI format 0/4 may be differently interpreted according to the position of a DL subframe in which corresponding DCI format 0/4 is transmitted.

For example, in a situation where a DL HARQ reference configuration (or SIB1 information-based UL-DL configuration) is set to UL-DL configuration #0, scheduling information (i.e., DCI format 0/4) related to the UL data channel (PUSCH) transmission may be transmitted in DL SFs #0, #1, #5 and #6.

In this example, a specific field of DCI format 0/4 transmitted in DL subframes (e.g., DL SFs #0 and #5) at a specific position among DL subframes (i.e., DL SFs #0, #1, #5 and #6) in which UL scheduling information is transmitted may be (re-)interpreted as being used for UL INDEX information, and the specific field of DCI format 0/4 transmitted in DL subframes (e.g., DL SFs #1 and #6) at the other positions may be (re-)interpreted as being used for UL DAI information (wherein, for example, the UL INDEX may be assumed to have a specific value (e.g., '01' (i.e., [CASE #B] of Table 6)) in SFs #1 and #6 used for UL DAI according to Rule #B described above).

As another proposed method, if at least one part (some or all) of the states defined by the specific field (i.e., the 2-bit field used for UL INDEX/UL DAI) of DCI format 0/4 may be performed differently according to the position of a DL subframe in which DCI format 0/4 is transmitted.

For example, in a situation where a DL HARQ reference configuration (or SIB1 information-based UL-DL configuration) is set as UL-DL configuration #0, at least one part (i.e., some or all) of the states related to the specific field (i.e., the 2-bit field used for UL INDEX/UL DAI) of DCI format 0/4 transmitted in DL subframes (e.g., DL SF #0 and #5) at specific positions among DL subframes (i.e., DL SFs #0, #1, #5 and #6) in which UL scheduling information is transmitted may be (re-)interpreted as being used for UL INDEX information (e.g., "[01], [10] and [11] are interpreted as UL INDEX information), and at least one part (i.e., some or all) of the states related to the specific field of DCI format 0/4 transmitted in DL subframes (e.g., DL SF #1 and #6) at the other positions may be (re-) interpreted as UL DAI information (e.g., "[01], [10] and [11] are interpreted as UL INDEX information, and [00] is interpreted as UL DAI information" or "[01], [10], [11] (and [00]) are interpreted as UL DAI information").

Further, information about the configuration of the specific field of DCI format 0/4 interpreted according to the position of a DL subframe or information about the interpreted information of at least one part (i.e., some or all) of states defined in the specific field of DCI format 0/4 according to Rule #D may be announced to the UE by the BS through a predefined signal (e.g., a physical layer signal or higher layer signal).

Hereinafter, description will be given of a case where interpretation of configuration of the specific field (i.e., the 2-bit field used for UL INDEX/UL DAI) of DCI format 0/4 is performed differently depending on the respective positions of the DL subframes according to Rule #D).

If the UL HARQ reference configuration (or SIB1 information-based UL-DL configuration) is given as UL/DL configuration 0, the position of a DL subframe in which scheduling information about a PUSCH in each UL SF is transmitted is given as follows.

UL SF #2→UL GRANT in SF #5 or #6
UL SF #3→UL GRANT in SF #6
UL SF #4→UL GRANT in SF #0
UL SF #7→UL GRANT in SF #0 or #1
UL SF #8→UL GRANT in SF #1
UL SF #9→UL GRANT in SF #5

UL DAI is a field that is needed only when a PUSCH with which HARQ-ACK is reported is scheduled. That is, requiring UL DAI for a specific UL grant is limited to a case where the UE transmits HARQ-ACK in a UL SF scheduled by the UL grant.

In order to stably transmit HARQ-ACK in a situation where the UL-DL configuration is dynamically changed, a DL HARQ reference configuration for defining a HARQ-ACK transmission time may be separately designated. Preferably, this DL HARQ reference configuration has a large number of DLs and a small number of ULs, and the UL SF on the DL HARQ reference configuration is used for transmission of HARQ-ACK while being constantly used for UL without being changed to DL.

When it is assumed that a UL-DL configuration corresponding to a case where one radio frame has one or two UL SFs is used as a DL HARQ reference configuration, the possible UL-DL configurations may be UL-DL configurations #2, #4 and #5. Considering a HARQ-ACK transmission time for each UL-DL configuration, each configuration is defined as follows:

DL HARQ reference configuration #2: HARQ-ACK is transmitted in UL SF #2 and #7. On the assumption that the DL HARQ reference configuration is UL-DL configuration 0, when the UL grant is transmitted in SFs #5, #6, #0 and #1, UL SF #2 and #7 are scheduled. These subframes correspond to all DL and special SFs on the UL HARQ reference configuration.

DL HARQ reference configuration #4: HARQ-ACK is transmitted in UL SFs #2 and #3. On the assumption that the UL-DL configuration 0 is given as the UL HARQ reference configuration as described above, when the UL grant is transmitted in SF #5 and #6, UL SF #2 and #3 are scheduled. This means that UL DAI is unnecessary in SF #0 and #1.

DL HARQ reference configuration #5: HARQ-ACK is transmitted in UL SF #2. On the assumption that UL-DL configuration 0 is given as the UL HARQ reference configuration as described above, when the UL grant is transmitted in SF #5 and #6, UL SF #2 is scheduled. This means that UL DAI is unnecessary in SF #0 and #1.

In conclusion, if the UL HARQ reference configuration is UL-DL configuration 0 and the DL HARQ reference configuration is UL-DL configuration 4 or 5, the field may be used for UL INDEXING in SF #0 and #1, and used for UL DAI in SF #5 and #6.

When the field is used for UL DAI, a PUSCH only for SF #2 and #3 may be defined to be scheduled in SF #5 and #6 (which may be interpreted as meaning that the value of UL INDEX is set to "01" in SF #5 and #6 in which the field is used for UL DAI (i.e., [CASE #B] of Table 6)). In this case, it is impossible to schedule a PUSCH for SF #9 using the UL grant. Since SF #9 is used for DL on all UL-DL configurations except UL-DL configuration #0, influence of scheduling restriction on SF #9 may be viewed as insignificant. In addition, SF #9 may be used for retransmission using a PHICH without the UL grant.

If an issue related to impossibility of PUSCH scheduling in SF #9 appears to be serious, the eNB may establish a configuration through a higher layer signal such as RRC to determine whether to interpret the 2 bits of a specific subframe as being used for UL INDEX or UL DAI.

That is, whether or not to interpret the specific field of DCI format 0 or 4 as being used for UL INDEX or UL DAI may be connected not only with a subframe in which the DCI format is transmitted but also with an established DL HARQ reference configuration. In addition, the eNB may operate to control, through a higher layer signal such as RRC, interpretation of the DCI format and a subframe in which interpretation is performed.

As another example, when the specific bit field of DCI format 0 or 4 transmitted at a specific DL subframe position is interpreted as being used for UL DAI, UL DAI signaling may be unnecessary at times other than the time at which a UL grant for scheduling a PUSCH in a UL SF (i.e., static UL SF) on a pre-established DL reference configuration is received. That is, UL DAI is a field that is useful when a PUSCH which is reported together with HARQ-ACK is scheduled (wherein the time to receive the UL grant is determined by a UL reference UL-DL configuration or a UL-DL configuration on an SIB).

Accordingly, for a UL grant transmitted at a time different from the time at which the UL grant for scheduling PUSCH transmission in a UL subframe on the DL reference UL-DL configuration is received, UL DAI may not be signaled, and the UL DAI field in the UL grant may be set to a pre-defined (or signaled) specific value (or zero padding).

For example, (the field value of) UL DAI set to a pre-defined (or signaled) specific value (or zero padding) may be used for virtual CRC. Specifically, if the UL reference UL-DL configuration and DL reference UL-DL configuration are established as UL-DL configuration 6 and UL-DL configuration 5 respectively, and the specific bit field of DCI format 0 or 4 is interpreted as UL DAI, UL DAI in subframes (i.e., SFs #0, #1, #6 and #9) other than SF #5 in which a UL grant for scheduling a PUSCH in UL SF #2 (or UL SF #12) on the DL reference UL-DL configuration may be set to a pre-defined (or signaled) specific value (or zero padding).

This example is also applicable in at least one of i) a case where configuration of the specific bit field of DCI format 0 or 4 is determined by a UL reference UL-DL configuration (for example, the specific bit field of DCI format 0 or 4 is interpreted as being used for UL INDEX only when the UL reference UL-DL configuration is set to UL-DL configuration 0, and is interpreted as being used for UL DAI when the UL reference UL-DL configuration is set to (remaining) UL-DL configurations other than the UL reference UL-DL configuration), ii) a case where configuration of the specific bit field of DCI format 0 or 4 is set differently according to the DL subframe positions (e.g., the specific bit field is interpreted as being used for UL INDEX in SF #0 and #1, and is interpreted as being used for UL DAI in SF #5 and #6), or iii) a case where whether to interpret the specific bit field as being used for UL INDEX or UL DAI is connected not only with a subframe in which the DCI format is transmitted but also with an established DL HARQ reference configuration.

In addition, this example may be applied only when i) UL DAI is defined as V_UL DAI (i.e., "HARQ-ACK Bundling, PUCCH Format 1b with Channel Selection with Rel-8/10 Mapping Tables" is configured in a single cell environment) or ii) UL DAI is defined as W_UL DAI (i.e., PUCCH format 3 is configured in a single cell environment or PUCCH Format 1b with Channel Selection with Rel-10 Mapping Table or PUCCH Format 3 is configured in the CA environment).

As another example, if the specific bit field of DCI format 0 or 4 transmitted at a specific DL subframe position is interpreted as being used for UL DAI, but "The number of HARQ-ACK bits for transmission on PUSCH can be determined by the size of the bundling window (i.e., M) for the DL HARQ timing reference configuration" is applied, the UL DAI is substantially meaningless.

Accordingly, in this case, the UL DAI may not be signaled, and the UL DAI field in the UL grant may be set to a pre-defined (or signaled) specific value (or zero padding).

For example, (the field value) of the UL DAI set to the pre-defined (or signaled) specific value (or zero padding) may be used for virtual CRC. In this case, if the UE receives at least one PDSCH or DL SPS release in one bundling window, the UE configures HARQ-ACK information corresponding to M and piggybacks the information on a PUSCH. Otherwise (namely, if the UE receives no PDSCH or DL SPS release), configuring HARQ-ACK and piggybacking on the PUSCH may be omitted.

In addition, this example may be applied only when i) UL DAI is defined as V_UL DAI (i.e., HARQ-ACK Bundling, PUCCH Format 1b with Channel Selection with Rel-8/10 Mapping Tables is configured in a single-cell environment) or ii) the UL DAI is defined as W_UL DAI (i.e., PUCCH Format 1b with Channel Selection with Rel-10 Mapping Table or PUCCH Format 3 is configured in the CA environment).

2. 5. Rule #E

The configuration of the specific field (i.e., the 2-bit field used for UL INDEX/UL DAI) of DCI format 0/4 may be interpreted differently depending on i) the value to which the specific field is set, and/or ii) a subframe in which PHICH information to be transmitted at the same time as DCI format 0/4 is transmitted, and/or iii) a value to which $I_{PHICH}$ of the PHICH information transmitted at the same time as DCI format 0/4 is set. LTE standard document 3 GPP TS 36.213 defines that $I_{PHICH}$ is set to 1 for TDD UL-DL configuration 0 and subframe n (=4 or 9) and is set to 0 for the other cases.

For example, if the specific field (i.e., the 2-bit field used for UL INDEX/UL DAI) of DCI format 0/4 is set to "[11]", the specific field is assumed to be used for UL INDEX information, and operation may be performed according to [CASE #C] of Table 6 (i.e., one UL scheduling information item (UL grant) defines two UL data channels (PUSCHs) transmitted at different times).

On the other hand, i) if the specific field (namely, the 2-bit field used for UL INDEX/UL DAI) of DCI format 0/4 is set to at least one (i.e., some or all) of the values listed below, and/or ii) PHICH information to be transmitted at the same time as DCI format 0/4 is transmitted at at least one (i.e., some or all) of the times listed below, and/or iii) the value of $I_{PHICH}$ of the PHICH information transmitted at the same time as DCI format 0/4 is set to at least one (some or all) of the values listed below, operation may be performed, assuming that the specific field is used for UL DAI information.

(1) The MSB of the specific field (i.e., the 2-bit field used for UL INDEX/UL DAI) of DCI format 0/4 is set to 1 (e.g., [10]).
(2) The LSB of the specific field (i.e., the 2-bit field used for UL INDEX/UL DAI) of DCI format 0/4 is set to 1 (e.g., [01]).
(3) The PHICH information having '$I_{PHICH}$=0' is received in DL SF#0 or DL SF #5.
(4) The PHICH information having '$I_{PHICH}$=1' is received in the DL SF#0 or DL SF #5.
(5) The PHICH information is received in the DL SF#1 or DL SF #6.

Herein, the DAI values linked to at least one part (i.e., some or all) of the states defined in the specific field may be differently defined according to the respective cases. Thereby, when UL load is high in an environment in which configuration of a radio resource is dynamic changed according to Rule #E (i.e., in a UL Traffic Heavy Situation), UL resources may be operated/scheduled efficiently (or with a relatively high priority).

As another method, at least one part (i.e., some or all) of the states defined by the specific field (i.e., the 2-bit field used for UL INDEX/UL DAI) of DCI format 0/4 may be interpreted differently depending on i) the value to which the specific field is set, and/or ii) a subframe in which PHICH information to be transmitted at the same time as DCI format 0/4 is transmitted, and/or iii) a value to which $I_{PHICH}$ of the PHICH information transmitted at the same time as DCI format 0/4 is set.

For example, in a situation where a DL HARQ reference configuration (or SIB1 information-based UL-DL configuration) is set to UL-DL configuration #0, if i) PHICH information having '$I_{PHICH}$=0' (transmitted the same time as DCI format 0/4) is received in DL SF#0 or DL SF #5, and/or ii) PHICH information having '$I_{PHICH}$=1' (transmitted the same time as DCI format 0/4) is received in the DL SF#0 or DL SF #5, at least one part (i.e., some or all) of the states related to the specific field (i.e., the 2-bit field used for UL INDEX/UL DAI) of DCI format 0/4 may be (re-)interpreted as UL DAI information (e.g., "[01], [10] and [11] are interpreted as UL INDEX information, and [00] is interpreted as UL DAI information" or "[01], [10], [11] (and [00]) are interpreted as UL DI information").

In Rule E, information about the purpose of (re-)use of the specific field (i.e., the 2-bit field used for UL INDEX/UL DAI) or information about the purpose of (re-)use of at least one part (i.e., some or all) of the states defined from the specific field may be delivered from the BS to the UE through a predefined signal (e.g., a physical layer signal or higher layer signal) based on at least one of i) the set value of the specific field (i.e., the 2-bit field used for UL INDEX/UL DAI) of DCI format 0/4, ii) a subframe time at which the PHICH information (transmitted simultaneously with DCI format 0/4) and iii) the set value of $I_{PHICH}$ of the PHICH information (transmitted simultaneously with DCI format 0/4).

2. 6. Rule #F

Configuration of the specific field (i.e., the 2-bit field used for UL INDEX/UL DAI) of DCI format 0/4 may be interpreted differently depending on i) the number of the UL subframes in which the DCI format received at a specific DL subframe time schedules UL data channels (PUSCHs) in a situation where operation is performed according to the HARQ timeline of the UL HARQ reference configuration (or the HARQ timeline of the SIB1 information-based UL-DL configuration), or ii) the number of PHICH information items (about (previous) UL data channels (PUSCHs)) are transmitted at a DL subframe time at which the DCI format is received in a situation where operation is performed according to the HARQ timeline of the UL HARQ reference configuration (or the HARQ timeline of the SIB1 information-based UL-DL configuration).

For example, If DCI format 0/4 received at a specific DL subframe time schedules UL data channels (PUSCHs) transmitted in two UL subframes respectively (or the specific field (i.e., the 2-bit field used for UL INDEX/UL DAI) of the DCI format is set to "[11]") in a case where operation is performed according to the HARQ timeline of the UL HARQ reference configuration (or the HARQ timeline of the SIB1 information-based UL-DL configuration), the specific field (i.e., the 2-bit field used for UL INDEX/UL DAI) in the DCI format may be defined to be interpreted as being used for UL INDEX information. If DCI format 0/4 received at a specific DL subframe time schedules a UL data channel transmitted in one UL subframe (or the specific field (i.e., the 2-bit field used for UL INDEX/UL DAI) in the DCI format is set to "[01], [10]([00])"), the specific field (i.e., the 2-bit field used for UL INDEX/UL DAI) in the DCI format may be defined to be interpreted as being used for UL DAI information. That is, in this case, when the UL HARQ reference configuration (or SIB1 information-based UL-DL configuration) is set to UL-DL configuration #0, the specific field (i.e., the 2-bit field used for UL INDEX/UL DAI) of DCI format 0/4 may be basically assumed to be used for UL INDEX.

In addition, configuration of the specific field (i.e., the 2-bit field used for UL INDEX/UL DAI) of DCI format 0/4 may be interpreted differently depending on the number of DL subframes for UL ACK/NACK information items transmitted simultaneously in a UL subframe in which UL ACK/NACK transmission for a DL subframe in which the DCI format is received is performed (i.e., a UL subframe in which UL ACK/NACK transmission is performed in response to a DL data channel (PDSCH) received in a DL subframe in which the DCI format is received) in a situation where operation is performed according to the HARQ timeline of the DL HARQ reference configuration.

2. 7. Rule #G

When at least one part (i.e., some or all) of the states related to the specific field of DCI format 0/4 is interpreted as being used for UL INDEX information (e.g., [CASE #A], [CASE #B] and [CASE #C] of Table 6 (wherein [CASE #C] represents a case where one piece of UL DCI information (i.e., DCI format 0/4) schedules multiple (i.e., 2) PUSCHs)), at least one of Options G-1 and G-2 described below may be defined to be employed. Additionally, the options may also be employed in the examples of [Rule #C] (e.g., in a case where the second bit of the specific field (i.e., the 2-bit field used for UL INDEX/UL DAI) of DCI format 0/4 is set to 1).

2. 7. 1 Option G-1

It is assumed that UL SF #N is a subframe in which UL ACK/NACK transmission for a DL subframe of a specific time at which a DCI format-based DL data channel (PDSCH) is received is performed according to the HARQ timeline of the DL HARQ reference configuration.

Herein, if one DL data channel (PDSCH) (or DL DAI set to a value greater than or equal to 1) has been received in M subframes associated with UL SF #N, the UE may generate the payload size of UL ACK/NACK (or the number of UL ACKs/NACKs) to piggyback on a UL data channel (PUSCH) transmitted in UL SF #N, in consideration of the number of DL subframes except the subframes actually used as UL SFs (or subframes for PUSCH (re-)transmission) among the M subframes.

This operation may also be equally performed in a case where the specific field (i.e., the 2-bit field used for UL INDEX/UL DAI) in DCI format 0/4 is used for UL INDEX or PUSCH (re-)transmission is performed using a method (e.g., PHICH or UL SPS) other than the UL Grant.

Herein, the UE may determine the number of subframes actually used as UL subframes among the M subframes based on the number of subframes in which UL data channel (PUSCH) transmission is actually scheduled (or performed) among the M subframes, through reception of a UL grant (or PHICH) based on the HARQ timeline of the UL HARQ reference configuration.

That is, the UE may ensure efficient generation of a UL ACK/NACK payload size (or the number of UL ACKs/NACKs) even when the UE fails to receive a reconfiguration message.

Specifically, K UL data channel (PUSCH) transmissions are scheduled (or performed) in M subframes associated with UL SF #N, the UE may configure only (M-K) UL ACKs/NACKs (or UL ACK/NACK payloads) and transmit the same piggybacked on a UL data channel (PUSCH) transmitted in UL SF #N.

2. 7. 1 Option G-2

If reception of a DL data channel (PDSCH) (or reception of DL DAI set to a value greater than or equal to 1) has not occurred in M subframes associated with UL SF #N in which UL ACK/NACK transmission for a DL subframe in which DCI format 0/4 (i.e., including UL scheduling information) is received is performed according to the HARQ timeline of the DL HARQ reference configuration, the UE does not transmit UL ACK/NACK information piggybacked on the UL data channel (PUSCH) transmitted in UL SF #N.

2. 8. Rule #H

When at least one part (i.e., some or all) of the states related to the specific field of DCI format 0/4 is interpreted as being used for UL INDEX information (e.g., [CASE #A], [CASE #B] and [CASE #C] of Table 6 (wherein [CASE #C] represents a case where one piece of UL DCI information (i.e., DCI format 0/4) schedules multiple (i.e., 2) PUSCHs)), at least one part (i.e., some or all) of the options proposed below may be defined to be employed. Additionally, the options may also be employed in the examples of [Rule #C] (e.g., in a case where the second bit of the specific field (i.e., the 2-bit field used for UL INDEX/UL DAI) of DCI format 0/4 is set to 1).

For example, suppose that UL ACK/NACK transmission for a DL SF of a specific time at which a DCI format-based PDSCH is received is performed in UL SF #N according to the HARQ timeline of the DL HARQ reference configuration, and there are M SFs associated with UL SF #N (namely, M SFs configured such that UL ACK/NACK transmission is performed in UL SF #N according to the HARQ timeline of the DL HARQ reference configuration).

Herein, if PUSCH (re-)transmission based on DCI format 0/4 (and/or PHICH) received in a DL subframe of a specific time among M SFs is performed in UL SF #N according to the HARQ timeline of the UL HARQ reference configuration, ACK/NACK bits for M (i.e., ACK/NACK Bundling Window Size M) SFs may be configured and piggybacked on the PUSCH (re-)transmitted in UL SF #N. Alternatively, if PUSCH (re-) transmission based on DCI format 0/4 (and/or PHICH) received in a DL subframe of a specific time among M SFs is performed in UL SF #N according to the HARQ timeline of the UL HARQ reference configuration, and at least one PDSCH (DL DAI set to a value greater than or equal to 1) is received in the M SFs, the ACK/NACK bits for the M (i.e., ACK/NACK Bundling Window Size M) SFs may be configured and piggybacked on the PUSCH (re-) transmitted in UL SF #N.

On the other hand, if PUSCH (re-)transmission based on DCI format 0/4 (and/or PHICH) received in a DL subframe of a specific time which is not among the M SFs is performed according to the HARQ timeline of the UL HARQ reference configuration in UL SF #N, the ACK/NACK bits for the M (i.e., ACK/NACK Bundling Window Size M) SFs may be configured and piggybacked on the PUSCH (re-)transmitted in UL SF #N. Alternatively, if PUSCH (re-)transmission based on DCI format 0/4 (and/or PHICH) received in a DL subframe of a specific time which is not among the M SFs is performed according to the HARQ timeline of the UL HARQ reference configuration in UL SF #N, and at least one PDSCH (DL DAI set to a value greater than or equal to 1) is received in the M SFs, ACK/NACK bits for M (i.e., ACK/NACK Bundling Window Size M) SFs may be configured and piggybacked on the PUSCH (re-)transmitted in UL SF #N.

However, due to dynamic change of configuration of radio resources, some of the M SFs may not be actually used for DL configuration. Further, unconditionally setting the bit size of ACK/NACK for M (i.e., ACK/NACK Bundling Window Size M) SFs in this situation may be immoderate or be undesirable in terms of ACK/NACK transmission/reception performance.

In this regard, the bit size of ACK/NACK to piggyback on a PUSCH (re-) transmitted in UL SF #N may be determined according to at least one of Rule H-1 to Rule H-3 proposed below.

Herein, Rule H-1 to Rule H-3 may be applied only when i) the UL HARQ reference configuration (or SIB-based configuration) is set to UL-DL configuration #0, and/or ii) the specific field (i.e., the 2-bit field used for UL INDEX/UL DAI) of DCI format 0/4 is used for UL INDEX information, and/or iii) the UL INDEX field is set to 11 (i.e., one DCI format 0/4 schedules PUSCHs (re-) to be transmitted in two UL SFs simultaneously), and/or iv) PUSCH (re-)transmission is performed through a method (e.g., UL SPS, PHICH) other than DCI format 0/4 (i.e., UL grant).

Rule H-1 to Rule H-3 may also be used when i) PUSCH (re-)transmission is performed in one UL SF (i.e., UL SF #N) through one DCI format 0/4 (and/or PHICH) received in a DL subframe of a specific time among M SFs or ii) PUSCH (re-)transmission is performed in two UL SFs (i.e., UL SF #N and another UL HARQ reference configuration-based UL SF) through one DCI format 0/4 (and/or PHICH) received in a DL subframe of a specific time among M SFs, according to the HARQ timeline of the UL HARQ reference configuration. On the contrary, Rule H-1 to Rule H-3 may be used when i) PUSCH (re-)transmission is performed in one UL SF (i.e., UL SF #N) through one DCI format 0/4 (and/or PHICH) received in a DL subframe of a specific time which is not from among M SFs or ii) PUSCH (re-)transmission is performed in two UL SFs (i.e., UL SF #N and another UL HARQ reference configuration-based UL SF) through one DCI format 0/4 (and/or PHICH) received in a DL subframe of a specific time which is not from among M SFs, according to the HARQ timeline of the UL HARQ reference configuration.

2. 8. 1. Rule #H-1

For simplicity, it is assumed in the following description that the index of a radio frame in which the PUSCH is (re-)transmitted is radio frame #X. In addition, based on a pre-configured reconfiguration period T, the application range of i) a currently updated UL-DL configuration, and/or ii) an updated UL-DL configuration applied to radio frame #X, and/or iii) an updated UL-DL configuration applied to a radio frame in which information scheduling/indicating PUSCH (re-)transmission in UL SF #N is received is assumed to be from "radio frame #Q to radio frame #(Q+T/10-1)." Herein, it is assumed that radio frame #X in which the PUSCH is (re-)transmitted is within the range from radio frame #Q to radio frame #(Q+T/10-1).

Rule #H-1 causes the UE to infer/draw UL-DL configuration candidates which are very likely to be currently employed, based on the UL SF positions of PUSCH transmissions which DCI format 0/4 (or PHICH) for scheduling/indicating (re-)transmission of a PUSCH on which the ACK/NACK bits in UL SF #N are piggybacked schedules/indicates.

Specifically, the UE may recognize all (valid) UL-DL configuration candidates reconfigurable by the BS, through pre-established DL reference UL-DL configuration information and UL reference UL-DL configuration (i.e., SIB-based UL-DL configuration) information. Thereby, the UE may narrow the range of UL-DL configuration candidates which are very likely to be substantially reconfigurable by the BS during the interval from radio frame #Q to radio frame #(Q+T/10-1) according to the UL SF positions of PUSCH transmissions scheduled/indicated by DCI format 0/4 (or PHICH) for scheduling/indicating (re-)transmission of a PUSCH on which the ACK/NACK bits in UL SF #N additionally piggybacked within the whole range of candidates.

Herein, the final UL-DL configuration candidates which are recognized by the UE and are very likely to be substantially reconfigurable by the BS during the interval from radio frame #Q to radio frame #(Q+T/10-1) may be limited to UL-DL configurations essentially including (one or more) UL SFs in which PUSCH (re-)transmission is scheduled/indicated according to DCI format 0/4 (or PHICH) for scheduling/indicating (re-) transmission of a PUSCH on which the ACK/NACK bits in UL SF #N are piggybacked.

For reference, Tables 7 to 9 below show UL-DL configuration candidates which may be inferred/drawn by the UE and are very likely to be substantially configurable by the BS during the interval from radio frame #Q to radio frame #(Q+T/10-1) depending on the UL SF positions of PUSCH transmissions scheduled the/indicated by DCI format 0/4 (or PHICH) for scheduling/indicating (re-)transmission of a PUSCH on which the ACK/NACK bits in UL SF #N are piggybacked in a situation where the UL reference UL-DL configuration (i.e., SIB-based UL-DL configuration) is set to UL-DL configuration #0.

Herein, for cases which are not explicitly disclosed in Tables 7 to 9, the bit size of ACK/NACK piggybacked on a PUSCH (re-)transmitted in UL SF #N may be configured for M (i.e., ACK/NACK Bundling Window Size M) SFs configured such that ACK/NACK is transmitted in UL SF #N according to the DL reference UL-DL configuration. UL-DL configuration candidates which are very likely to be substantially reconfigurable by the BS and may be inferred/drawn by the UE change depending on how the DL reference UL-DL configuration is configured. In addition, a description will be given below of a case where PUSCHs are transmitted in two UL SFs simultaneously through one DCI format 0/4 (and/or PHICH) received in a DL subframe of a specific time (which is and/or is not from among M SFs). UL SF #N in which the ACK/NACK bits are piggybacked on the PUSCH corresponds to one of the two UL SFs.

Tables and 7 to 9 show various examples of (re-)established UL-DL configuration candidates inferable by the UE.

TABLE 7

When DL REFERENCE CONFIGURATION is established as UL-DL CONFIGURATION #2
(i.e., all candidates (re-)configurable by the BS are "UL-DL CONFIGURATION = {#0, 1, 2, 6}")

| UL GRANT/PHICH reception time | UL INDEX value | PUSCH transmission time | (re-)established UL-DL CONIFIGURATION candidates inferable by the UE | Remarks |
|---|---|---|---|---|
| SF #(10 · (X − 1) + 5) | 11 | SF #(10 · (X − 1) + 9), SF #(10 · X + 2) | 0 | Scheduling information about a PUSCH (on which ACK/NACK information is piggybacked) transmitted in the third SF (i.e., SF #(10 · X + 2)) in RADIO FRAME #X may be interpreted as being transmitted in the sixth SF (i.e., SF #(10 · (X − 1) + 5)) in RADIO FRAME #(X − 1), and the corresponding SF (i.e., SF #(10 · (X − 1) + 5)) belongs to a (DL) SF set (i.e., Bundling Window Size) configured such that ACK/NACK information is transmitted in the third SF (i.e., SF #(10 · X + 2)) in RADIO FRAME #X. |
| SF #(10 · (X − 1) + 6) | 11 | SF #(10 · X + 2), SF #(10 · X + 3) | 0, 1, 6 | Scheduling information about a PUSCH (on which ACK/NACK information is piggybacked) transmitted in the third SF (i.e., SF #(10 · X + 2)) in RADIO FRAME #X may be interpreted as being transmitted in the seventh SF (i.e., SF #(10 · (X − 1) + 6)) in RADIO FRAME #(X − 1), and the corresponding SF (i.e., SF #(10 · (X − 1) + 6)) belongs to a (DL) SF set (i.e., Bundling Window Size) configured such that ACK/NACK information is transmitted in the third SF (i.e., SF #(10 · X + 2)) in RADIO FRAME #X. |
| SF #(10 · X + 1) | 11 | SF #(10 · X + 7), SF #(10 · X + 8) | 0, 1, 6 | Scheduling information about a PUSCH (on which ACK/NACK information is piggybacked) transmitted in the eighth SF (i.e., SF #(10 · X + 7)) in RADIO FRAME #X may be interpreted as being transmitted in the second SF (i.e., SF #(10 · X + 1)) in RADIO FRAME #X, and the corresponding SF (i.e., SF #(10 · X + 1)) belongs to a (DL) SF set (i.e., Bundling Window Size)) configured such that ACK/NACK information is transmitted in the eighth SF (i.e., SF #(10 · X + 7)) in RADIO FRAME #X. |
| SF #(10 · X + 0) | 11 | SF #(10 · X + 4), SF #(10 · X + 7) | 0, 6 | Scheduling information about a PUSCH (on which ACK/NACK information is piggybacked) transmitted in the eighth SF (i.e., SF #(10 · X + 7)) in RADIO FRAME #X may be interpreted as being transmitted in the first SF (i.e., SF #(10 · X + 0)) in RADIO FRAME #X, and the corresponding SF (i.e., SF |

TABLE 7-continued

When DL REFERENCE CONFIGURATION is established as UL-DL CONFIGURATION #2
(i.e., all candidates (re-)configurable by the BS are "UL-DL CONFIGURATION = {#0, 1, 2, 6}")

| UL GRANT/PHICH reception time | UL INDEX value | PUSCH transmission time | (re-)established UL-DL CONIFIGURATION candidates inferable by the UE | Remarks |
|---|---|---|---|---|
| | | | | #(10 · X + 0)) belongs to a (DL) SF set (i.e., Bundling Window Size)) configured such that ACK/NACK information is transmitted in the eighth SF (i.e., SF #(10 · X + 7)) in RADIO FRAME #X. |

TABLE 8

When DL REFERENCE CONFIGURATION is established as UL-DL CONFIGURATION #4
(i.e., all candidates (re-)configurable by the BS are "UL-DL CONFIGURATION = {#0, 1, 3, 4, 6}")

| UL GRANT/PHICH reception time | UL INDEX value | PUSCH transmission time | (re-)established UL-DL CONFIGURATION candidates inferable by the UE | Remarks |
|---|---|---|---|---|
| SF #(10 · (X − 1) + 5) | 11 | SF #(10 · (X − 1) + 9), SF #(10 · X + 2) | 0 | Scheduling information about a PUSCH (on which ACK/NACK information is piggybacked) transmitted in the third SF (i.e., SF #(10 · X + 2)) in RADIO FRAME #X may be interpreted as being transmitted in the sixth SF (i.e., SF #(10 · (X − 1) + 5)) in RADIO FRAME #(X − 1), and the corresponding SF (i.e., SF #(10 · (X − 1) + 5)) belongs to a (DL) SF set (i.e., Bundling Window Size) configured such that ACK/NACK information is transmitted in the third SF (i.e., SF #(10 · X + 2)) in RADIO FRAME #X. |

TABLE 9

When DL REFERENCE CONFIGURATION is estanlished as UL-DL CONFIGURATION#5
(i.e., all candidates (re-)configurable by the BS are "UL-DL CONFIGURATION = {#0, 1, 2, 3, 4, 5, 6}")

| UL GRANT/PHICH reception time | UL INDEX value | PUSCH transmission time | (re-)established UL-DL CONFIGURATION candidates inferable by the UE | Remarks |
|---|---|---|---|---|
| SF #(10 · (X − 1) + 5) | 11 | SF #(10 · (X − 1) + 9), SF #(10 · X + 2) | 0 | Scheduling information about a PUSCH (on which ACK/NACK information is piggybacked) transmitted in the third SF (i.e., SF #(10 · X + 2)) in RADIO FRAME #X may be interpreted as being transmitted in the sixth SF (i.e., SF #(10 · (X − 1) + 5)) in RADIO FRAME #(X − 1), and the corresponding SF (i.e., SF #(10 · (X − 1) + 5)) belongs to a (DL) SF set (i.e., Bundling Window Size) configured such that ACK/NACK information is transmitted in |

TABLE 9-continued

When DL REFERENCE CONFIGURATION is estanlished as UL-DL CONFIGURATION#5
(i.e., all candidates (re-)configurable by the BS are "UL-DL CONFIGURATION = {#0, 1, 2, 3, 4, 5, 6}")

| UL GRANT/PHICH reception time | UL INDEX value | PUSCH transmission time | (re-)established UL-DL CONFIGURATION candidates inferable by the UE | Remarks |
|---|---|---|---|---|
| SF #(10 · (X − 1) + 6) | 11 | SF #(10 · X + 2), SF #(10 · X + 3) | 0, 1, 3, 4, 6 | the third SF (i.e., SF #(10 · X + 2)) in RADIO FRAME #X. Scheduling information about a PUSCH (on which ACK/NACK information is piggybacked) transmitted in the third SF (i.e., SF #(10 · X + 2)) in RADIO FRAME #X may be interpreted as being transmitted in the seventh SF (i.e., SF #(10 · (X − 1) + 6)) in RADIO FRAME #(X − 1), and the corresponding SF (i.e., SF #(10 · (X − 1) + 6)) belongs to a (DL) SF set (i.e., Bundling Window Size) configured such that ACK/NACK information is transmitted in the third SF (i.e., SF #(10 · X + 2)) in RADIO FRAME #X. |

2. 8. 2. Rule #H-2

The bit size of ACK/NACK piggybacked on a PUSCH (re-)transmitted in UL SF #N may be determined based on a UL-DL configuration (corresponding to a SUPER SET of the DL SF SET) including the most DL subframes among UL-DL configuration candidates very likely to be substantially reconfigurable by the BS during the interval from radio frame #Q to radio frame #(Q+T/10-1) inferable by the UE from Tables 7 to 9 and Rule #H-1 rather than from the DL reference UL-DL configuration. Herein, the UL-DL configuration including the most DL subframes may be interpreted as a UL-DL configuration that includes a DL subframe set (or position) of the UL reference UL-DL configuration and has the most DL SFs among UL-DL configuration candidates very likely to be reconfigurable.

Rule #H-2 is advantageous in that the bit size of ACK/NACK piggybacked on a PUSCH can be reduced with high reliability, regardless of whether or not reception of a reconfiguration message transmitted from the BS is successful.

Further, for cases which are not explicitly disclosed in Tables 7 to 9, the bit size of ACK/NACK piggybacked on a PUSCH (re-)transmitted in UL SF #N may be configured for M (i.e., ACK/NACK Bundling Window Size M) SFs configured such that ACK/NACK is transmitted in UL SF #N according to the DL reference UL-DL configuration.

For example, it is assumed that in a situation where the DL reference UL-DL configuration and the UL reference UL-DL configuration (i.e., SIB-based UL-DL configuration) are established as UL-DL configuration #5 and UL-DL configuration #0, respectively, the UE receives UL scheduling information (i.e., UL GRANT) with UL INDEX set to "11" in DL SF #16, and performs PUSCH transmission in UL SF #22 and UL SF #23 according to the UL reference UL-DL configuration.

In this case, the UE checks, in Rule #H-1 and Table 9, UL-DL configuration candidates (i.e., UL-DL configuration #0, 1, 3, 4, 6) which are very likely to be reconfigurable by the BS during the interval from radio frame #Q to radio frame #(Q+T/10-1), and then determines the bit size of ACK/NACK piggybacked on a PUSCH (re-) transmitted in UL SF #22 (i.e., the time to transmit ACK/NACK for SF #9, SF #10, SF #11, SF #13, SF #14, SF #15, SF #16, SF #17 and SF #18 according to the DL reference UL-DL configuration), based on UL-DL configuration #4, which is a UL-DL configuration (corresponding to a SUPER SET of the DL SF SET) including the most DL subframes among UL-DL configuration candidates.

In other words, the UE determines the bit size of ACK/NACK piggybacked on a PUSCH (re-)transmitted in UL SF #22 in consideration of only the number of SFs actually designated to be used as DL SFs on UL-DL configuration #4 among SF #9, SF #10, SF #11, SF #13, SF #14, SF #15, SF #16, SF #17 and SF #18 for which ACK/NACK is to be transmitted in UL SF #22 according to UL-DL configuration #5 (i.e., the DL reference UL-DL configuration).

According to Rule #H-2 described above, the UE configures ACK/NACK bits for 8 SFs (i.e., SF #9, SF #10, SF #11, SF #14, SF #15, SF #16, SF #17 and SF #18) actually designated to be used as DL SFs on UL-DL configuration #4 rather than ACK/NACK bits for the 9 UL-DL configuration #5 (i.e., DL reference UL-DL configuration)-based SFs in UL SF #22, and piggybacks the same on a PUSCH (re-) transmitted in SF #22.

Tables 10 to 12 show UL-DL configurations (corresponding to SUPER SETs of the DL SF SET) including the most DL subframes among UL-DL configuration candidates which are very likely to be substantially reconfigurable by the BS during the interval from radio frame #Q to radio frame #(Q+T/10-1) which the UE may infer from Tables 7 to 9 and Rule #H-1.

The bit size of ACK/NACK piggybacked on a PUSCH (re-)transmitted in UL SF #N may be determined based on a UL-DL configuration (corresponding to a SUPER SET of the UL SF SET) including the least DL subframes among UL-DL configuration candidates very likely to be substantially reconfigurable by the BS during the interval from radio frame #Q to radio frame #(Q+T/10-1) inferable by the UE from Tables 7 to 9 and Rule #H-1 rather than from the DL reference UL-DL configuration.

Herein, the UL-DL configuration including the least DL subframes may be interpreted as a UL-DL configuration that includes a UL subframe set (or position) of the UL reference UL-DL configuration and has the most UL SFs among UL-DL configuration candidates very likely to be reconfigurable Tables 10 to 12 show various exemplary UL-DL configurations including the most DL SFs among (re-)established UL-DL configuration candidates inferably by the UE.

TABLE 10

D When DL REFERENCE CONFIGURATION is established as UL-DL CONFIGURATION #2
(i.e., all candidates (re-)configurable by the BS are "UL-DL CONFIGURATION = {#0, 1, 2, 6}")

| UL GRANT/PHICH reception time | UL INDEX value | PUSCH transmission time | (re-)established UL-DL CONFIGURATION candidates inferable by the UE | Remarks |
|---|---|---|---|---|
| SF #(10 · (X − 1) + 5) | 11 | SF #(10 · (X−1) + 9), SF #(10 · X + 2) | 0 | Scheduling information about a PUSCH (on which ACK/NACK information is piggybacked) transmitted in the third SF (i.e., SF #(10 · X + 2)) in RADIO FRAME #X may be interpreted as being transmitted in the sixth SF (i.e., SF #(10 · (X − 1) + 5)) in RADIO FRAME #(X − 1), and the corresponding SF (i.e., SF #(10 · (X − 1) + 5)) belongs to a (DL) SF set (i.e., Bundling Window Size) configured such that ACK/NACK information is transmitted in the third SF (i.e., SF #(10 · X + 2)) in RADIO FRAME #X. |
| SF #(10 · (X − 1) + 6) | 11 | SF #(10 · X + 2), SF #(10 · X + 3) | 1 | Scheduling information about a PUSCH (on which ACK/NACK information is piggybacked) transmitted in the third SF (i.e., SF #(10 · X + 2)) in RADIO FRAME #X may be interpreted as being transmitted in the seventh SF (i.e., SF #(10 · (X − 1) + 6)) in RADIO FRAME #(X − 1), and the corresponding SF (i.e., SF #(10 · (X − 1) + 6)) belongs to a (DL) SF set (i.e., Bundling Window Size) configured such that ACK/NACK information is transmitted in the third SF (i.e., SF #(10 · X + 2)) in RADIO FRAME #X. |
| SF #(10 · X + 1) | 11 | SF #(10 · X + 7), SF #(10 · X + 8) | 1 | Scheduling information about a PUSCH (on which ACK/NACK information is piggybacked) transmitted in the eighth SF (i.e., SF #(10 · X + 7)) in RADIO FRAME #X may be interpreted as being transmitted in the second SF (i.e., SF #(10 · X + 1)) in RADIO FRAME #X, and the corresponding SF (i.e., SF #(10 · X + 1)) belongs to a (DL) SF set (i.e., Bundling Window Size)) configured such that ACK/NACK information is transmitted in the eighth SF (i.e., SF #(10 · X + 7)) in RADIO FRAME #X. |
| SF #(10 · X + 0) | 11 | SF #(10 · X + 4), SF #(10 · X + 7) | 6 | Scheduling information about a PUSCH (on which ACK/NACK information is piggybacked) transmitted in |

TABLE 10-continued

D When DL REFERENCE CONFIGURATION is established as UL-DL CONFIGURATION #2
(i.e., all candidates (re-)configurable by the BS are "UL-DL CONFIGURATION = {#0, 1, 2, 6}")

| UL GRANT/PHICH reception time | UL INDEX value | PUSCH transmission time | (re-)established UL-DL CONFIGURATION candidates inferable by the UE | Remarks |
|---|---|---|---|---|
| | | | | the eighth SF (i.e., SF #(10 · X + 7)) in RADIO FRAME #X may be interpreted as being transmitted in the first SF (i.e., SF #(10 · X + 0)) in RADIO FRAME #X, and the corresponding SF (i.e., SF #(10 · X + 0)) belongs to a (DL) SF set (i.e., Bundling Window Size)) configured such that ACK/NACK information is transmitted in the eighth SF (i.e., SF #(10 · X + 7)) in RADIO FRAME #X. |

TABLE 11

When DL REFERENCE CONFIGURATION is established as UL-DL CONFIGURATION #4
(i.e., all candidates (re-)configurable by the BS are "UL-DL CONFIGURATION = {#0, 1, 3, 4, 6}")

| UL GRANT/PHICH reception time | UL INDEX value | PUSCH transmission time | (re-)established UL-DL CONFIGURATION candidates inferable by the UE | Remarks |
|---|---|---|---|---|
| SF #(10 · (X − 1) + 5) | 11 | SF #(10 · (X − 1) + 9), SF #(10 · X + 2) | 0 | Scheduling information about a PUSCH (on which ACK/NACK information is piggybacked) transmitted in the third SF (i.e., SF #(10 · X + 2)) in RADIO FRAME #X may be interpreted as being transmitted in the sixth SF (i.e., SF #(10 · (X − 1) + 5)) in RADIO FRAME #(X − 1), and the corresponding SF (i.e., SF #(10 · (X − 1) + 5)) belongs to a (DL) SF set (i.e., Bundling Window Size) configured such that ACK/NACK information is transmitted in the third SF (i.e., SF #(10 · X + 2)) in RADIO FRAME #X. |

TABLE 12

When DL REFERENCE CONFIGURATION is estanlished as UL-DL CONFIGURATION#5
(i.e., all candidates (re-)configurable by the BS are "UL-DL CONFIGURATION = {#0, 1, 2, 3, 4, 5, 6}")

| UL GRANT/PHICH reception time | UL INDEX value | PUSCH transmission time | (re-)established UL-DL CONFIGURATION candidates inferable by the UE | Remarks |
|---|---|---|---|---|
| SF #(10 · (X − 1) + 5) | 11 | SF #(10 · (X − 1) + 9), SF #(10 · X + 2) | 0 | Scheduling information about a PUSCH (on which ACK/NACK information is piggybacked) transmitted in the third SF (i.e., SF #(10 · X + 2)) in RADIO FRAME #X may be interpreted as being transmitted in the sixth SF |

TABLE 12-continued

When DL REFERENCE CONFIGURATION is estanlished as UL-DL CONFIGURATION#5
(i.e., all candidates (re-)configurable by the BS are "UL-DL CONFIGURATION = {#0, 1, 2, 3, 4, 5, 6}")

| UL GRANT/PHICH reception time | UL INDEX value | PUSCH transmission time | (re-)established UL-DL CONFIGURATION candidates inferable by the UE | Remarks |
|---|---|---|---|---|
| SF #(10 · (X − 1) + 6) | 11 | SF #(10 · X + 2), SF #(10 · X + 3) | 4 | (i.e., SF #(10 · (X − 1) + 5)) in RADIO FRAME #(X − 1), and the corresponding SF (i.e., SF #(10 · (X − 1) + 5)) belongs to a (DL) SF set (i.e., Bundling Window Size) configured such that ACK/NACK information is transmitted in the third SF (i.e., SF #(10 · X + 2)) in RADIO FRAME #X. Scheduling information about a PUSCH (on which ACK/NACK information is piggybacked) transmitted in the third SF (i.e., SF #(10 · X + 2)) in RADIO FRAME #X may be interpreted as being transmitted in the seventh SF (i.e., SF #(10 · (X − 1) + 6)) in RADIO FRAME #(X − 1), and the corresponding SF (i.e., SF #(10 · (X − 1) + 6)) belongs to a (DL) SF set (i.e., Bundling Window Size) configured such that ACK/NACK information is transmitted in the third SF (i.e., SF #(10 · X + 2)) in RADIO FRAME #X. |

2. 8. 3. Rule #H-3

Rule #H-1 and Rule #H-2 may also be used when 는, multiple cells (or component carriers) are configured (or used) through carrier aggregation (CA), and the BS informs the UE of reconfiguration information (or reconfigured UL-DL configuration information) about the multiple cells (or component carriers) simultaneously through a specific field (of one or common position) in a reconfiguration message (namely, the reconfiguration information received through the (one) specific field is applied to the multiple cells (or component carriers) simultaneously).

In other words, in this case, since UL-DL configurations of the multiple cells (or component carriers) are (re-)changed to the same UL-DL configuration simultaneously, it may be assumed that in the perspective of one specific cell (or carrier component), the substantially re-established highly possible UL-DL configuration candidates drawn from Rule #H-1 and Rule #H-2 are the same on the other remaining cells (or component carriers). Thereby, the ACK/NACKACK/NACK bit size for multiple cells (or component carriers) transmitted by piggybacked on a PUSCH (re-)transmitted in UL SF #N on a specific cell may be reduced (namely, ACK/NACKACK/NACK bits may be reduced by the same number for the respective cells).

3. Third Embodiment

According to a second embodiment, if the DL HARQ reference configuration is set to one of UL-DL configurations #2, #4 and #5 (i.e., when different UL-DL configurations are provided) in a situation where the UL HARQ configuration (or SIB1 information-based UL-DL configuration) is set to UL-DL configuration #0, the specific field (e.g., 2-bit field) of DCI format 0/4 may be interpreted differently depending on a search space (SS) through which DCI format 0/4 is transmitted/received between the CSS and the USS.

Specifically, the specific field (e.g., 2-bit field) may be interpreted as being used for UL INDEX information if DCI format 0/4 is transmitted/received through the CSS. On the other hand, the specific field (e.g., 2-bit field) may be interpreted as being used for UL DAI information if DCI format 0/4 is transmitted/received through the USS. Alternatively, it may be defined in the opposite manner In addition, if DCI format 0/4 is transmitted/received through the CSS, the specific field (e.g., 2-bit field) may be interpreted according to one of Rule #A to Rule #H described above. If DCI format 0/4 is transmitted/received through the USS, the specific field (e.g., 2-bit field) may be interpreted differently from the case where DCI format 0/4 is transmitted/received through the CSS.

Additionally, if DCI format 0/4 is transmitted/received through the CSS, the specific field (e.g., 2-bit field) may be interpreted as being used for UL INDEX information, and i) UL DAI information items for the respective states (of the specific field) or ii) UL DAI information items for respective UL INDEX information items may be assumed to be set to pre-defined (or signaled) values (e.g., different values or the same value).

4. Fourth Embodiment

In the cases according to the first to third embodiment described above, interpretation of the specific field of DCI format 0/4 (e.g., interpreting the specific field as a UL DAI information-related field or a UL INDEX information-related field) and/or interpretation of "an assumption (e.g., one example in the first to third embodiments" associated with at least one part (i.e., some or all) of the states related to the specific field may change depending on the type of a UL-DL configuration (re-)established by the reconfiguration message.

Herein, if UL-DL configuration #0 is (re-)established by the reconfiguration message, the specific field (i.e., 2-bit field) of DCI format 0/4 may be interpreted as being used for UL INDEX information. On the other hand, if a UL-DL configuration other than UL-DL configuration #0 is (re-)established by the reconfiguration message, the specific field (i.e., 2-bit field) of DCI format 0/4 may be interpreted as being used for UL DAI information.

As another example, if UL-DL configuration #0 is (re-)established by the reconfiguration message, state "[01]" related to the specific field (i.e., 2-beat field) of DCI format 0/4 may be interpreted as UL INDEX=[01]. On the other hand, if a UL-DL configuration other than UL-DL configuration #0 is (re-)established by the reconfiguration message, state "[01]" related to the specific field (i.e., 2-beat field) of DCI format 0/4 may be interpreted as UL INDEX=[11].

Further, the embodiments (i.e., the first to fourth embodiments) of the present invention may also be employed in a case where at least one of multiple UL-DL configurations provided for the UE, namely SIB1 information-based UL-DL configuration (or RadioResourceConfigCommonSCell IE information-based UL-DL configuration), a UL-DL configuration related to a DL HARQ reference configuration, a UL-DL configuration related to a UL HARQ reference configuration, and a currently (re-) established UL-DL configuration is designated as a predefined UL-DL configuration (e.g., UL-DL configuration #0). Herein, if there is no UL-DL configuration established as the specific predefined UL-DL configuration (e.g., UL-DL configuration #0) among the multiple UL-DL configurations provided for the UE, the specific field (e.g., 2-beta field) of DCI format 0/4 may be interpreted as being used for UL DAI information (or UL INDEX information) according to a predefined rule.

In the embodiments of the present invention described above, the bundling window size related to the UL INDEX information (and/or UL DAI information) may be defined according to a UL-DL configuration related to a DL HARQ reference configuration, a UL-DL configuration related to a UL HARQ reference configuration, SIB1 information-based UL-DL configuration, or a UL-DL configuration re-established by the reconfiguration message.

Further, the embodiments of the present invention described above may be employed only when i) dynamic change of configuration of a radio resource is configured, and/or ii) a specific transmission mode (TM) is established, and/or iii) a specific UL-DL configuration is established, and/or iv) a specific UL ACK/NACK transmission scheme (e.g., ACK/NACK bundling, ACK/NACK multiplexing, PUCCH format 1B W/channel selection, PUCCH format 3) is configured, and/or v) UL ACK/NACK is transmitted over a PUSCH (or PUCCH).

5. Fifth Embodiment

According to a fifth embodiment, when a UL reference configuration is established as UL-DL configuration #0, the specific field (i.e., the 2-bit field used for UL INDEX/UL DAI) of DCI Format 0/4 may be used based on at least one of Rule #5-1 to Rule #5-7.

In the fifth embodiment, all rules except Rule #5-1 may interpret the specific field (i.e., the 2-bit field used for UL INDEX/UL DAI) is being used for UL DAI under a specific condition such that the HARQ-ACK bit size piggybacked on the UL data channel (PUSCH) is adaptively changed in consideration of only i) subframes related to (transmission of) the PDSCH that is actually transmitted to the UE (within a DL reference configuration-based bundling window) and/or ii) subframes related to PDCCH/EPDCCH transmission for delivering DL SPS RELEASE information.

In other words, the problem of constantly determining the HARQ-ACK bit size piggybacked on the UL data channel to be the maximum size in consideration of the DL reference configuration-based bundling window size (i.e., M) may be addressed.

TABLE 13

[Rule#5-1]: The UL INDEX is used in DCI format 0/4, when UL-DL configuration 0 is configured as UL Reference Configuration
[Rule#5-2]: The UL DAI can be used in DCI format 0/4, using UL DAI in all SFs for all the dynamically indicated configurations other than configuration #0 and assuming predefined SF-specific UL INDEX values

| | Example (1) of the predefined SF-specific UL INDEX values | | | | | | | | | |
|---|---|---|---|---|---|---|---|---|---|---|
| Operated UL/DL | Subframe number n | | | | | | | | | |
| Configuration | 0 | 1 | 2 | 3 | 4 | 5 | 6 | 7 | 8 | 9 |
| 1 | 01 | 01 | | | | 01 | 01 | | | |
| 2 | 01 | 10 | | | | 01 | 10 | | | |
| 3 | 10 | | | | | 01 | 01 | | | |
| 4 | | | | | | 01 | 01 | | | |
| 5 | | | | | | 01 | 10 | | | |
| 6 | 10 | 10 | | | | 01 | 01 | | | |

| | Example (2) of the predefined SF-specific UL INDEX values | | | | | | | | | |
|---|---|---|---|---|---|---|---|---|---|---|
| Operated UL/DL | Subframe number n | | | | | | | | | |
| Configuration | 0 | 1 | 2 | 3 | 4 | 5 | 6 | 7 | 8 | 9 |
| 1-6 | 10 | 10 | | | | 01 | 01 | | | |

TABLE 13-continued

[Rule#5-3]: The UL DAI can be used in DCI format 0/4, using UL DAI in all SFs for some of the dynamically indicated UL-DL configurations
    For configurations #0 and #6: UL INDEX
    For other configurations: UL DAI
[Rule#5-4]: The UL DAI can be used in DCI format 0/4, where the usage of UL INDEX or UL DAI in DCI format 0/4 depends on the index of DL/S SF, i.e., using UL DAI in SF #1 and #6 (with UL INDEX value always set to 01)
[Rule#5-5]: For the UL Reference Configuration 0, UL DAI is used only in subframe #6 (with UL INDEX value always set to 01) when the DL reference configuration is 4, while UL INDEX is used in all other cases
[Rule#5-6]: For a UE configured with eIMTA on a serving cell with SIB-1 UL-DL configuration 0,
    DCI format 0 in common search space (CSS) is same as currently specified and UL INDEX is always assumed
    DCI format 0/4 in UE specific search space (USS) shall always contain 2-bit for UL INDEX and 2-bit UL DAI
[Rule#5-7]: Divide the current 2-bit DAI or UL INDEX field, into two fields of 1-bit that, respectively, serve as both UL INDEX and DAI (when TDD UL-DL configuration 0 is the legacy one)

When Rule #5-2 to Rule #5-7 described above are employed, Assumption #5-1 or Assumption #5-2 may be additionally defined to be made. Assumption #5-1 or Assumption #5-2 given below may address the problem of different interpretations/assumptions between the BS and the UE on the specific field (i.e., the 2-bit field used for UL INDEX/UL DAI) of DCI Format 0 or DCI Format 4 within an RRC Ambiguity Duration (i.e., an interval at which the assumption on whether to apply a dynamic change mode (i.e., 'eIMTA Mode') of a radio resource configuration may differ between the BS and the UE) which is produced or may be produced when the eIMTA Mode is switched to Enabled/Disabled through a higher layer signal (e.g., RCC).

Assumption #5-1: In the Common Search Space (CSS), the specific field (i.e., the 2-bit field used for UL INDEX/UL DAI) of DCI Format 0 may be defined to be interpreted as being used for UL INDEX or UL DAI. For example, the BS may transmit a DCI format through the CSS (to ensure the fallback operation of the UE) within the RRC Ambiguity Duration.

Assumption #5-2: In the UE-specific Search Space (USS), the specific field (i.e., the 2-bit field used for UL INDEX/UL DAI) of DCI Format 0/4 may be defined to be interpreted according to one of the rules described above (e.g., Rule #5-2 to Rule #5-7).

6. Sixth Embodiment

According to a sixth embodiment, as described in Table 13, in the case where the UL reference configuration is established as UL-DL configuration #0, i) the specific field (i.e., the 2-bit field used for UL INDEX/UL DAI) of the existing DCI format (e.g., DCI Format 0/4) may be interpreted as being used for UL DAI when a predefined condition is met, or ii) an additional field for UL DAI may be defined in an existing DCI Format (e.g., DCI Format 0/4), thereby adaptively changing the HARQ-ACK bit size piggybacked on the UL data channel (PUSCH) in consideration of actual PDSCH transmission subframes (and/or PDCCH/EPDCCH transmission subframes for delivering DL SPS RELEASE information) within the DL reference configuration-related bundling window.

In this embodiment, a discussion will be given of which of the UL DAI values should be used/assumed (for each PUSCH on which HARQ-ACK is piggybacked) when one UL scheduling information (UL Grant) received at a specific time (i.e., SF #N) based on the UL reference configuration (i.e., UL-DL Configuration #0) indicates PUSCH transmission in multiple (e.g., 2) UL subframes, and HARQ-ACK is piggybacked on the PUSCH transmitted in at least one (i.e., some or all) of the UL subframes.

As a specific example, when Rule #5-6 of Table 13 is employed (in the USS), if a UL Grant (e.g., DCI Format 0/4) received at a specific time (i.e., SF #N) indicates PUSCH transmission on two UL subframes (of different times), and HARQ-ACK is piggybacked on the PUSCHs transmitted in the two UL subframes, the additionally defined 2-bit UL DAI of the DCI Format (e.g., DCI Format 0/4) received in SF #N may be commonly applied to the PUSCHs (on which HARQ-ACK is piggybacked) transmitted in the two UL subframes (hereinafter, "[RULE #6-A]"). That is, this operation may be interpreted as meaning that the additionally defined 2-bit UL DAI of the DCI Format received in SF #N is commonly used in determining the bit size of HARQ-ACK (piggybacked) on the PUSCHs transmitted in the two UL subframes.

As another example, when Rule #5-6 of Table 13 is employed (in the USS), if a UL Grant (e.g., DCI Format 0/4) received at a specific time (i.e., SF #N) indicates PUSCH transmission on two UL subframes (e.g., UL SF #K1 and UL SF #K2, wherein K1 is a positive integer (including 0) less than K2) (of different times), and HARQ-ACK is piggybacked on the PUSCHs transmitted in the two UL subframes, the additionally defined 2-bit UL DAI of the DCI Format (e.g., DCI Format 0/4) received in SF #N may be applied only to the PUSCH (on which HARQ-ACK is piggybacked) transmitted in UL SF #K1, and the maximum number of SFs (e.g., PDSCH transmission SFs, SFs for PDCCH/EPDCCH transmission for delivering DL SPS RELEASE information) associated with UL SF #K2 may be determined as the HARQ-ACK bit size according to the DL reference configuration on the PUSCH (on which HARQ-ACK is piggybacked) transmitted in UL SF #K2.

As another example, when Rule #5-6 of Table 13 is employed (in the USS), if a UL Grant (e.g., DCI Format 0/4) received at a specific time (i.e., SF #N) indicates PUSCH transmission on two UL subframes (of different times), and HARQ-ACK is piggybacked only on the PUSCH transmitted in one of the two UL subframes, the additionally defined 2-bit UL DAI of the DCI Format (e.g., DCI Format 0/4) received in SF #N may be applied only to the PUSCH (on which HARQ-ACK is piggybacked) transmitted in the one UL subframe (hereinafter, "[RULE #6-B]"). That is, this operation may be interpreted as meaning that the additionally defined 2-bit UL DAI of the DCI Format received in SF #N is used only in determining the bit size of HARQ-ACK for the PUSCH on which HARQ-ACK is piggybacked between the PUSCHs transmitted in the two UL subframes.

For example, a pre-defined (or signaled) specific UL DAI value (i.e., a value independent from the additionally defined 2-bit UL DAI of the DCI Format received in SF #N) may be used/assumed on the PUSCH on which HARQ-ACK is not piggybacked between the PUSCHs transmitted in the two UL subframes.

As another example, when Rule #5-6 of Table 13 is employed (in the USS), if a UL Grant (e.g., DCI Format 0/4) received at a specific time (i.e., SF #N) indicates PUSCH transmission on two UL subframes (e.g., UL SF #K1 and UL SF #K2, wherein K1 is a positive integer (including 0) less than K2) (of different times), and HARQ-ACK is piggybacked only on the PUSCH transmitted in UL SF #K1, the additionally defined 2-bit UL DAI of the DCI Format (e.g., DCI Format 0/4) received in SF #N may be applied to the PUSCH (on which HARQ-ACK is piggybacked) transmitted in UL SF #K1.

On the other hand, if a UL Grant received at a specific time (i.e., SF #N) indicates PUSCH transmission on two UL subframes (e.g., UL SF #K1 and UL SF #K2, wherein K1 is a positive integer (including 0) less than K2) (of different times), and HARQ-ACK is piggybacked only on the PUSCH transmitted in UL SF #K2, the maximum number of SFs (e.g., PDSCH transmission SFs, SFs for PDCCH/EPDCCH transmission for delivering DL SPS RELEASE information) associated with UL SF #K2 may be determined as the HARQ-ACK bit size according to the DL reference configuration on the PUSCH (on which HARQ-ACK is piggybacked) transmitted in UL SF #K2. That is, this operation may be interpreted as meaning that the additionally defined 2-bit UL DAI of the DCI Format received in SF #N is not used. In addition, the 2-bit UL DAI may be used for virtual CRC by setting the 2-bit UL DAI to a predefined value.

The following examples include Example #6-1 and Example #6-2, which correspond to a situation where CA is not employed and Example #6-3 and Example #6-4, which correspond to a situation where CA is employed, in relation to [RULE#6-A] and [RULE#6-B].

Example #6-1: For a cell (i.e., "eIMTA-enabled Cell") operated in the dynamic change mode of radio resource configurations, the SIB UL-DL Configuration (i.e., UL reference configuration) is established as UL-DL Configuration #0, the DL reference configuration is established as UL-DL Configuration #4, and the Actual UL-DL Configuration (i.e., a UL-DL Configuration (re-)established by the reconfiguration message) is established as UL-DL Configuration #3. In this case, if the 2-bit UL DAI and 2-bit UL INDEX in the DCI Format (i.e., Rule #5-6 of Table 13) received in SF #16 are set to "01" and "11", respectively, and UL A/N information items related to SFs #10, #11, #14 and #15 and UL A/N information items related to SFs #16, #17, #18 and #19 piggyback on the PUSCHs transmitted in SF #22 and SF #23, the additionally defined 2-bit UL DAI value (i.e., "01") in the DCI format received in SF #16 is commonly used according to [RULE #A] in determining the bit size of HARQ-ACK (piggybacked) on the PUSCHs transmitted in SF #22 and SF #23.

Example #6-2: For a cell (i.e., "eIMTA-enabled Cell") operated in the dynamic change mode of radio resource configurations, the SIB UL-DL configuration (i.e., UL reference configuration) is established as UL-DL Configuration #0, the DL reference configuration is established as UL-DL Configuration #5, and the actual UL-DL configuration (i.e., a UL-DL Configuration (re-)established by the reconfiguration message) is established as UL-DL Configuration #4. if the 2-bit UL DAI and 2-bit UL INDEX in the DCI Format (i.e., Rule #5-6 of Table 13) received in SF #16 are set to "01" and "11", respectively, and UL A/N information items related to SF #10, #11, #13, #14, #15, #16, #17, #18 and #19 are piggybacked only on the PUSCH transmitted in SF #22 (namely, No UL A/N information item is piggybacked on the PUSCH transmitted in SF #23), the additionally defined 2-bit UL DAI value (i.e., "01") in the DCI format received in SF #16 is used according to [RULE #B] only in determining the bit size of HARQ-ACK (piggybacked) on the PUSCH transmitted in SF #22.

Example #6-3: It is assumed that two cells (i.e., an eIMTA-enabled PCell and an eIMTA-enabled SCell) are configured through CA. Herein, for the eIMTA-enabled PCell, it is assumed that the SIB UL-DL configuration (i.e., UL reference configuration), DL reference configuration, and actual UL-DL configuration are established as UL-DL Configuration #0, UL-DL Configuration #4, and UL-DL Configuration #3, respectively. For the eIMTA-enabled SCell, it is assumed that the tdd-Config-r10-based UL-DL configuration, DL reference configuration, and actual UL-DL configuration are established as UL-DL Configuration #0, UL-DL Configuration #5, and UL-DL Configuration #4, respectively. In addition, for the eIMTA-enabled SCell, it is assumed that the cross carrier scheduling (CCS) from the eIMTA-enabled PCell is configured. Thereby, it is assumed that the final DL reference configuration is established as UL-DL Configuration #4 and the final UL reference configuration is established as UL-DL Configuration #0 for the eIMTA-enabled SCell/eIMTA-enabled PCell.

In this situation, it is assumed that the 2-bit UL DAI and 2-bit UL INDEX in the DCI format received in SF #16 (i.e., Rule #5-6 of Table 13) of the eIMTA-enabled PCell are set to "01" and "11", respectively and that the DCI Format is eIMTA-enabled SCell-related control information (i.e., the CIF field indicates the eIMTA-enabled SCell).

Herein, if UL A/N information items related to SFs #10, #11, #14 and #15 of the eIMTA-enabled SCell and/or eIMTA-enabled PCell are piggybacked on a PUSCH transmitted in SF #22 of the eIMTA-enabled SCell, and UL A/N information items related to SFs #16, #17, #18 and #19 of the eIMTA-enabled SCell and/or eIMTA-enabled PCell are piggybacked on a PUSCH transmitted in SF #23 of the eIMTA-enabled SCell, the additionally defined 2-bit UL DAI value (i.e., "01") in the DCI format received in SF #16 of the eIMTA-enabled PCell may be commonly used according to [RULE#A] described above in determining the bit sizes of HARQ-ACK (piggybacked) on the PUSCHs transmitted in SF #22 and SF #23 of the eIMTA-enabled SCell.

Example #6-4: It is assumed that two cells (i.e., an eIMTA-enabled PCell and an eIMTA-enabled SCell) are configured through CA. Herein, for the eIMTA-enabled PCell, it is assumed that the SIB UL-DL configuration (i.e., UL reference configuration), DL reference configuration, and actual UL-DL configuration are established as UL-DL Configuration #0, UL-DL Configuration #5, and UL-DL Configuration #3, respectively. For the eIMTA-enabled SCell, it is assumed that the tdd-Config-r10-based UL-DL configuration, DL reference configuration, and actual UL- DL configuration are established as UL-DL Configuration #0, UL-DL Configuration #4, and UL-DL Configuration #4, respectively. In addition, for the eIMTA-enabled SCell, it is assumed that the cross carrier scheduling (CCS) from the eIMTA-enabled PCell is configured. Thereby, it is assumed that the final DL reference configuration is established as UL-DL Configuration #5 and the final UL reference configuration is established as UL-DL Configuration #0 for the eIMTA-enabled SCell/eIMTA-enabled PCell. On this assumption, it is assumed that the 2-bit UL DAI and 2-bit UL INDEX in the DCI format received in SF #16 (i.e., Rule #5-6 of Table 13) of the eIMTA-enabled PCell are set to "01" and "11", respectively and that the DCI Format is eIMTA-enabled SCell-related control information (i.e., the CIF field indicates the eIMTA-enabled SCell).

Herein, if UL A/N information items related to SFs #10, #11, #13, #14, #15, #16, #17, #18 and #19 of the eIMTA-enabled SCell and/or eIMTA-enabled PCell are piggybacked on a PUSCH transmitted in SF #22 of the eIMTA-enabled SCell (i.e., no UL A/N information item of eIMTA-enabled SCell and/or eIMTA-enabled PCell is piggybacked on a PUSCH transmitted in SF #23 of the eIMTA-enabled SCell), the additionally defined 2-bit UL DAI value (i.e., "01") in the DCI format received in SF #16 of the eIMTA-enabled PCell may be used according to [RULE#6-B] only in determining the bit size of HARQ-ACK (piggybacked) on the PUSCH transmitted in SF #22 of the eIMTA-enabled SCell.

Further, when Rule #5-6 of Table 13 is employed (in the USS), the UL DAI field (i.e., the UL DAI field may be useful in scheduling a PUSCH on which UL A/N is piggybacked) may be unnecessary at times other than the time at which a UL grant for scheduling a PUSCH in a UL SF (i.e., a static UL SF) on a pre-established DL reference configuration is received (e.g., the UL Grant reception time is determined by the UL reference configuration or SIB UL-DL configuration). Accordingly, the additionally defined 2-bit UL DAI of a DCI format (e.g., DCI format 0/4) transmitted at times other than the time at which the UL grant for scheduling PUSCH transmission in a UL SF on the DL reference configuration is received may be set to a pre-defined (or signaled) value or zero padding. For example, the 2-bit UL DAI set to a pre-defined (or signaled) value or zero padding may be used for virtual CRC.

Specifically, in a situation where Rule #5-6 of Table 13 is employed (i.e., in the USS), if the SIB UL-DL configuration (i.e., UL reference configuration) is established as UL-DL Configuration #0, the DL reference configuration is established as UL-DL Configuration #5, and the actual UL-DL configuration is established as UL-DL Configuration #4 for a cell operated in the dynamic change mode of radio resource configurations, only the additionally defined 2-bit UL DAI of the DCI format (e.g., DCI format 0/4) field received in SF #5 and SF #6 (namely, times when a PUSCH on which UL A/N is piggybacked (i.e., the PUSCH transmitted in SF #12) can be scheduled) may be interpreted as being actually used for UL DAI.

On the other hand, the additionally defined 2-bit UL DAI of the DCI format (e.g., DCI format 0/4) field received in SF #0 and SF #1 (namely, times when a PUSCH on which UL A/N is piggybacked (i.e., the PUSCH transmitted in SF #12) cannot be scheduled) may be interpreted as having a pre-defined (or signaled) value (i.e., being used for virtual CRC).

The sixth embodiment may be employed only when i) UL DAI is defined as V_UL DAI (i.e., HARQ-ACK Bundling and PUCCH Format 1b with Channel Selection with Rel-8/10 Mapping Tables is configured in a single-cell environment) or ii) the UL DAI is defined as W_UL DAI (i.e., PUCCH Format 1b with Channel Selection with Rel-10 Mapping Table or PUCCH Format 3 is configured in the CA environment).

In addition, the proposed method may be configured to be applied only when CA employed (or CA is not employed). Additionally, the proposed method may be configured to be applied only in a specific cell (e.g., a PCell (or Scheduling Cell) or SCell (or Scheduled Cell)) related to CA.

Further, the embodiments of the present invention described above may also be employed in a case where at least one of multiple UL-DL configurations provided for the UE, namely i) SIB1 information-based UL-DL configuration, ii) RadioResourceConfigCommonSCell IE information-based UL-DL configuration, iii) a UL-DL configuration related to a DL HARQ reference configuration, iv) a UL-DL configuration related to a UL HARQ reference configuration, and v) a currently (re-) established UL-DL configuration is designated as a predefined UL-DL configuration (e.g., UL-DL configuration #0). Herein, if there is no UL-DL configuration established as the specific predefined UL-DL configuration (e.g., UL-DL configuration #0) among the multiple UL-DL configurations provided for the UE, the specific field (e.g., 2-beta field) of DCI format 0 or DCI format 4 may be interpreted as being used for UL DAI information or UL INDEX information according to a predefined rule.

In the embodiments of the present invention described above, the bundling window size related to at least one of the UL INDEX information and the UL DAI information may be defined according to i) a UL-DL configuration related to a DL HARQ reference configuration, ii) a UL-DL configuration related to a UL HARQ reference configuration, iii) SIB1 information-based UL-DL configuration, or iv) a UL-DL configuration re-established by the reconfiguration message.

Further, the embodiments of the present invention described above may be employed only in at least one of i) a case where dynamic change of configuration of a radio resource is configured, ii) a case where a specific transmission mode (TM) is established, iii) a case where a specific UL-DL configuration is established, iv) a case where a specific UL ACK/NACK transmission scheme (e.g., ACK/NACK bundling, ACK/NACK multiplexing, PUCCH format 1B W/channel selection, PUCCH format 3) is configured, v) a case where UL ACK/NACK is transmitted over a PUSCH, and vi) a case where UL ACK/NACK is transmitted over a PUCCH.

It is apparent that the embodiments/configurations/rules can be considered as one independent example for implementing the present invention. The embodiments described herein may be implemented independently or in a combination thereof.

It is apparent that each of the embodiments/rules/configurations can be considered as one independent invention. Further, the invention may be implemented in a combination of at least one of the embodiments described above.

Figure 15:
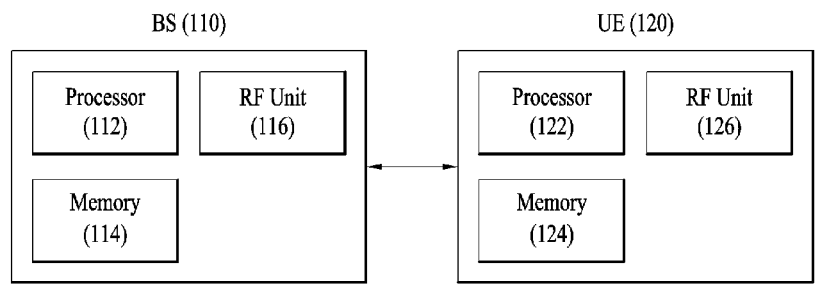
FIG. 15 exemplarily shows a base station and a user equipment which are applicable to an embodiment of the present invention.

FIG. 15 exemplarily shows a BS and a UE which are applicable to an embodiment of the present invention. If a relay is included in a wireless communication system, communication on the backhaul link may be performed between the base station and the relay, and communication on the access link is performed between the relay and the UE. Accordingly, the base station or UE illustrated in the figure may be replaced with the relay according to a situation.

Referring to FIG. 15, a wireless communication system includes a BS 110 and a UE 120. The BS 110 includes a processor 112, a memory 114 and a radio frequency (RF) unit 116. The processor 112 may be configured to implement the procedures and/or methods proposed in the present invention. The memory 114 is connected to the processor 112 and stores various kinds information related to operation of the processor 112. The RF unit 116 is connected to the processor 112, and transmits and/or receives a radio signal. The UE 120 includes a processor 122, a memory 124 and an RF unit 126. The processor 122 may be configured to implement the procedures and/or methods proposed in the present invention. The memory 124 is connected to the processor 122 and stores various kinds information related to operation of the processor 122. The RF unit 126 is connected to the processor 122, and transmits and/or receives a radio signal. The BS 110 and/or the UE 120 may have a single antenna or multiple antennas.

The embodiments described above are constructed by combining elements and features of the present invention in a predetermined form. Each element or feature should be understood as optional unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment. Claims that are not explicitly cited in each other in the appended claims may be combined to establish an embodiment of the present invention or be included in a new claim by subsequent amendment after the application is filed.

Embodiments of the present invention may be implemented by various means such as, for example, hardware, firmware, software, or combinations thereof. When practiced in hardware, one embodiment of the present invention may be implemented by one or more ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, and the like.

When practiced in firmware or software, an embodiment of the present invention may be implemented in the form of a module, a procedure, a function, or the like which performs the functions or operations described above. Software code may be stored in the memory unit and executed by the processor. The memory unit may be disposed inside or outside the processor to transceive data with the processor via various well-known means.

The present invention may be carried out in other specific ways than those set forth herein without departing from the characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein.

INDUSTRIAL APPLICABILITY

A method for transmitting and receiving a downlink signal in a wireless communication system and a device therefor have been described above, focusing on a case where the present invention is applied to a 3GPP LTE system. The present invention is also applicable to various wireless communication systems other than the 3GPP LTE system.

What is claimed is:

1. A method for receiving a downlink (DL) control signal in a time division duplex (TDD) wireless communication system supporting reconfiguration of a radio resource, the method comprising:
    establishing an SIB (System Information Block)-based Uplink-Downlink (UL-DL) configuration 0 as an uplink (UL) reference configuration;
    establishing one of uplink-downlink setting # {2, 4, 5} as a DL reference configuration; and
    receiving DL control information containing a specific field for defining a UL index or a DL assignment index,
    wherein when the DL control information is received through a common search space and a DL control information format (DCI format) associated with the DL control information is DCI format 0 or DCI format 4, the specific field is determined to be an UL index, and
    wherein when the DL control information is received through a UE-specific search space and the downlink control information format associated with the downlink control information is DCI format 0 or DCI format 4, the specific field is determined as a downlink assignment index.

2. The method according to claim 1, further comprising:
    transmitting at least one Hybrid ARQ-ACK/NACK (HARQ-ACK/NACK) over a Physical Uplink Shared CHannel (PUSCH), the PUSCH being based on the DL control information.

3. The method according to claim 2, wherein:
    at least one UL subframe for transmitting the PUSCH is determined according to the UL index; and
    a size of the at least one HARQ-ACK/NACK is defined based on the DL assignment index.

4. The method according to claim 2, wherein a size of the at least one HARQ-ACK/NACK is determined based only on an UL subframe for transmitting the at least one HARQ/ACK in a piggyback manner among at least one UL subframe for transmitting the PUSCH.

5. The method according to claim 1, wherein:
    the DL assignment index is valid only when the DL control information is received on a specific DL subframe; and
    the specific DL subframe is a DL subframe for reception of DL control information indicating PUSCH transmission in a specific UL subframe based on a DL reference configuration.

6. The method according to claim 5, wherein, when the DL assignment index is not valid, the DL assignment index is used for virtual cycle redundancy check.

7. A terminal for receiving a downlink (DL) control signal in a time division duplex (TDD) wireless communication system supporting reconfiguration of a radio resource, the terminal comprising:
    a radio frequency (RF) unit; and
    a processor, wherein the processor is configured to:
    establish an SIB (System Information Block)-based Uplink-Downlink (UL-DL) configuration 0 as an uplink (UL) reference configuration;

establish one of uplink-downlink setting # {2, 4, 5} as a DL reference configuration; and control the RF unit to receive DL control information containing a specific field for defining a UL index or a DL assignment index, wherein when the DL control information is received through a common search space and a DL control information format (DCI format) associated with the DL control information is DCI format 0 or DCI format 4, the specific field is determined as an UL index, and wherein when the DL control information is received through a UE-specific search space and the downlink control information format associated with the downlink control information is DCI format 0 or DCI format 4, the specific field is determined as a downlink assignment index.

8. The terminal according to claim 7, wherein the processor is further configured to control the RF unit to transmit at least one Hybrid ARQ-ACK/NACK (HARQ-ACK/NACK) over a Physical Uplink Shared CHannel (PUSCH), the PUSCH being based on the DL control information.

9. The terminal according to claim 8, wherein:
at least one UL subframe for transmitting the PUSCH is determined according to the UL index; and
a size of the at least one HARQ-ACK/NACK is defined based on the DL assignment index.

10. The terminal according to claim 8, wherein a size of the at least one HARQ-ACK/NACK is determined based only on an UL subframe for transmitting the at least one HARQ/ACK in a piggyback manner among at least one UL subframe for transmitting the PUSCH.

11. The terminal according to claim 7, wherein:
the DL assignment index is valid only when the DL control information is received on a specific DL subframe; and
the specific DL subframe is a DL subframe for reception of DL control information indicating PUSCH transmission in a specific UL subframe based on a DL reference configuration.

12. The terminal according to claim 11, wherein, when the DL assignment index is not valid, the DL assignment index is used for virtual cycle redundancy check.

* * * * *